United States Patent
Wu

(10) Patent No.: US 11,917,410 B2
(45) Date of Patent: Feb. 27, 2024

(54) INTEGRITY PROTECTION WITH MESSAGE AUTHENTICATION CODES HAVING DIFFERENT LENGTHS

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 48 days.

(21) Appl. No.: 17/419,401

(22) PCT Filed: Dec. 30, 2019

(86) PCT No.: PCT/US2019/068884
§ 371 (c)(1),
(2) Date: Jun. 29, 2021

(87) PCT Pub. No.: WO2020/159654
PCT Pub. Date: Aug. 6, 2020

(65) Prior Publication Data
US 2022/0070670 A1    Mar. 3, 2022

Related U.S. Application Data

(60) Provisional application No. 62/798,007, filed on Jan. 29, 2019.

(51) Int. Cl.
*H04L 29/06* (2006.01)
*H04W 12/106* (2021.01)
(Continued)

(52) U.S. Cl.
CPC ......... *H04W 12/106* (2021.01); *H04L 9/3242* (2013.01); *H04L 63/123* (2013.01); *H04W 76/27* (2018.02); *H04L 2209/80* (2013.01)

(58) Field of Classification Search
CPC .. H04W 12/106; H04W 76/27; H04L 9/3242; H04L 63/123; H04L 2209/80
See application file for complete search history.

(56) References Cited

U.S. PATENT DOCUMENTS 8,493,854 B2 * 7/2013 Park ..................... H04W 8/26
370/231
9,131,398 B2 * 9/2015 Liu ..................... H04L 27/2613
(Continued)

FOREIGN PATENT DOCUMENTS

CN    101199184 A    6/2008
CN    101753308 A    6/2010
(Continued)

OTHER PUBLICATIONS

International Search Report and Written Opinion for Application No. PCT/US2019/068884, dated Mar. 26, 2020.
(Continued)

*Primary Examiner* — Shawnchoy Rahman
(74) *Attorney, Agent, or Firm* — MARSHALL, GERSTEIN & BORUN LLP

(57) ABSTRACT

A method in a user device that supports a plurality of message authentication code (MAC) lengths for integrity protection of wireless communications includes receiving, from a base station, a first message including an information element (1002), determining, based on the information element, that a first MAC length of the plurality of MAC lengths is to be used for integrity protection (1004) and, thereafter, generating a second message including a MAC having the first MAC length (1006). The method also includes transmitting the second message to the base station (1008).

20 Claims, 17 Drawing Sheets

(51) Int. Cl.
   *H04W 76/27*   (2018.01)
   *H04L 9/32*   (2006.01)
   *H04L 9/40*   (2022.01)

(56) References Cited

U.S. PATENT DOCUMENTS

| | | | |
|---|---|---|---|
| 10,080,098 | B1 | 9/2018 | Edge |
| 11,405,785 | B2 * | 8/2022 | Kimba Dit Adamou .................... H04L 41/0803 |
| 2002/0174332 | A1 | 11/2002 | Vialen et al. |
| 2009/0163211 | A1 | 6/2009 | Kitazoe et al. |
| 2011/0014377 | A1 | 1/2011 | Mosley |
| 2015/0296414 | A1 | 10/2015 | Yi et al. |
| 2017/0257762 | A1 | 9/2017 | Ginzboorg et al. |
| 2018/0217323 | A1 | 8/2018 | Lyngsøe et al. |
| 2021/0153021 | A1 * | 5/2021 | Kimba Dit Adamou .................... H04W 12/106 |

FOREIGN PATENT DOCUMENTS

| | | | | |
|---|---|---|---|---|
| CN | 101904213 | A | | 12/2010 |
| CN | 106922217 | A | | 7/2017 |
| CN | 109246705 | A | | 1/2019 |
| CN | 109890076 | A | * | 6/2019 ............ H04W 72/04 |
| CN | 110881216 | A | | 3/2020 |
| WO | WO-2011/020375 | A1 | | 2/2011 |
| WO | WO-2018/182482 | A1 | | 10/2018 |
| WO | WO-2018182482 | A1 | * | 10/2018 |
| WO | WO-2018/205427 | A1 | | 11/2018 |
| WO | WO-2018/228365 | A1 | | 12/2018 |
| WO | WO-2019109945 | A1 | * | 6/2019 ............ H04W 72/04 |
| WO | WO-2020/159654 | A1 | | 8/2020 |
| WO | WO-2020159654 | A1 | * | 8/2020 ........... H04L 63/123 |

OTHER PUBLICATIONS

Digital Cellular Telecommunications System (Phase 2+) (GSM); Universal Mobile Telecommunications System (UMTS); LTE; 3GPP System Architecture Evolution (SAE); Security Architecture, (3GPP TS 33.401 version 15.5.0 Release 15); ETSI TS 133 401, V15.5.0, Oct. 2018, 162 pages.
Digital Cellular Telecommunications System (Phase 2+) (GSM); Universal Mobile Telecommunications System (UMTS); LTE; 3GPP System Architecture Evolution (SAE); Security Architecture, (3GPP TS 33.401 version 15.4.0 Release 15); ETSI TS 133 401, V15.4.0, Jul. 2018, 162 pages.
5G; NR; Radio Resource Control (RRC); Protocol Specification, (3GPP TS 38.331 version 15.3.0 Release 15); ETSI TS 138 331, V15.3.0, Oct. 2018, 441 pages.
"3rd Generation Partnership Project; Technical Specification Group Radio Access Network; NG Radio Access Network (NG-RAN); Stage 2 functional specification of User Equipment (UE) positioning in NG-RAN (Release 15)," 3GPP TS 38.305 (Dec. 2018).
"3rd Generation Partnership Project; Technical Specification Group Radio Access Network; NR; Radio Resource Control (RRC) protocol specification (Release 15)," 3GPP TS 38.331 (Mar. 2019).
"3rd Generation Partnership Project; Technical Specification Group Radio Access Network; NR; NR and NG-RAN Overall Description; Stage 2 (Release 15)," 3GPP TS 38.300 (Dec. 2018).
"3rd Generation Partnership Project; Technical Specification Group Services and System Aspects; Study on Enhancement to the 5GC LoCation Services (Release 16)," 3GPP TR 23.731 (Dec. 2018).
"5G; Non-Access-Stratum (NAS) protocol for 5G System (5GS); Stage 3 (3GPP TS 24.501 version 16.0.2 Release 16)," 3GPP TS 24 501 (Mar. 2019).
"LTE; Evolved Universal Terrestrial Radio Access (E-UTRA); LTE Positioning Protocol (LLP)," 3GPP TS 36.335 (Apr. 2019).
CATT, "Consideration on Supporting Local LMF in NR Positioning R16," 3GPP Draft (Nov. 16, 2018).
China Mobile, "Local network exposure with LLMF," 3GPP Draft (Dec. 2018).
First Examination Report for India Application No. 202147038063, dated May 26, 2022.
Huawei, "Update of Solution 4 "Positioning operations considering different LMF deployment scenarios"," 3GPP Draft (Jun. 1, 2018).
Office Action for European Application No. 19845675.8, dated Jan. 23, 2023.
First Office Action for Chinese Application No. 201980090627.1, dated Oct. 23, 2023.

* cited by examiner

INTEGRITY PROTECTION WITH MESSAGE AUTHENTICATION CODES HAVING DIFFERENT LENGTHS

FIELD OF THE DISCLOSURE

This disclosure relates to integrity protection of wireless communications and, more particularly, to wireless communication systems that support two or more different message authentication code lengths.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless communication networks typically use integrity protection techniques to prevent or reduce network attacks, such as "forgery" attacks that mimic valid messages. In some cellular systems, for example, a transmitting device uses a particular integrity protection algorithm and input parameters to compute a message authentication code (or "MAC," which is not to be confused with the more widely used acronym for "media access control"), and sends the MAC along with the message being transmitted. The receiving device computes the expected MAC using the same algorithm and input parameters as the transmitting device, and verifies the data integrity of the message by comparing the expected MAC to the MAC in the received message.

A longer MAC increases the number of possible MAC values, which in turn decreases the likelihood that an attacker will be able to generate a MAC that matches the expected MAC. If a legitimate (non-attacker) transmitting device uses a 32-bit MAC, for example, the "correct" MAC will be one out of $2^{32}$ (roughly four billion) possible sequences. While this is a large number, an attacker device might eventually succeed by continuously flooding the network with messages using different MACs. A 256-bit MAC, however, would result in $2^{256}$ possible sequences, making it virtually impossible to match the expected MAC in any reasonable time frame.

The 3rd Generation Partnership Project (3GPP) TS 33.501 v15.2.0 specifies that, for fifth-generation (5G) networks, the transmitting device computes a 32-bit access stratum MAC ("MAC-I") or non-access stratum (NAS)-MAC ("NAS-MAC"), for control plane and user plane messages, using a particular integrity protection algorithm and set of input parameters. To improve security, the 3GPP has initiated a study to determine whether the MAC-I and NAS-MAC can be increased to 64, 128 or even 256 bits without overly degrading system performance. Even if such an increase does not significantly degrade system performance, however, this would likely introduce incompatibility issues arising from different devices using different MAC lengths.

For example, when transmitting a packet data convergence protocol (PDCP) protocol data unit (PDU) that includes a control plane Radio Resource Control (RRC) message, a 5G base station (e.g., a gNB) might compute a MAC-I to append to the RRC message using a 256-bit algorithm, but an otherwise-compatible user device (commonly referred to using the acronym UE, which stands for "user equipment") that receives the PDCP PDU might compute an expected MAC-I (referred to as an "XMAC-I") using a 32-bit algorithm. Or, the transmitting base station might compute a MAC-I using a 32-bit algorithm, while the receiving UE computes the XMAC-I using a 256-bit algorithm. In both of these scenarios, because the XMAC-I does not match the MAC-I, the receiving UE fails to verify/authenticate the message, and therefore ignores/discards the message. Ultimately, in such scenarios, communication between the base station and UE cannot proceed.

SUMMARY

At some point during an exchange of messages with a user device of this disclosure, a base station (e.g., a gNB) of this disclosure decides to use a particular message authentication code (MAC) length for integrity protection (e.g., in the access stratum). The decision may be based at least in part on the MAC length capabilities of the user device. The user device itself may inform the base station of the user device MAC length capabilities, or a core network (e.g., a 5GC) may inform the base station of the user device MAC length capabilities after learning of those capabilities from a different network element such as another base station or a registration server (e.g., via an authentication server function or "AUSF" of 5GC). Alternatively, the core network may decide to use a particular MAC length, and then configure the base station to use that MAC length.

After the base station determines (or is informed of) the desired MAC length, the base station sends the user device a message indicating that MAC length. The message may be an RRC message (e.g., an RRC Reconfiguration message) or a Security Mode Command message contained in a PDCP PDU, for example. In some implementations, to provide integrity protection of the message that indicates the desired MAC length, the message includes a MAC having a different length. For example, the user device may initially default to a shorter MAC length, and the base station may provide integrity protection for the message that indicates MAC length by computing and appending a MAC having the shorter length. In such an implementation, the user device verifies the shorter MAC appended to the message, e.g., by computing an expected MAC having the shorter MAC length and comparing that expected MAC to the appended MAC. After the user device receives the message indicating the desired MAC length, and possibly verifies a MAC of another (e.g., shorter) length that is appended to that message, the user device uses MACs of the indicated MAC length to provide integrity protection for one or more additional messages that the user device sends to and/or receives from the base station.

In some implementations, the base station message indicates the desired MAC length specifically for user plane messages, in which case the user device uses the indicated MAC length for user plane messages (e.g., PDCP PDUs sent or received via a data radio bearer (DRB)) but not necessarily for control plane messages (e.g., RRC messages sent or received via a signal radio bearer (SRB)). For example, the user device may continue to use a default (e.g., shorter) MAC length for control plane messages, unless the base station sends a separate message indicating that the new MAC length is to be used for control plane messages. In one such implementation, the base station sends a Security Command Message indicating that the new MAC length is to be used for user plane messages, and a separate RRC message (e.g., an RRC Reconfiguration message) indicating that the new MAC length is also to be used for control plane messages. In other implementations, the base station message indicates that the MAC length is to be used for both user plane and control plane messages.

One example implementation of these techniques is a method in a user device that supports a plurality of MAC lengths for integrity protection of wireless communications. The method includes receiving, by processing hardware and from a base station, a first message including an information element; determining, by the processing hardware and based on the information element, that a first MAC length of the plurality of MAC lengths is to be used for integrity protection; and, after determining that the first MAC length is to be used for integrity protection, generating, by the processing hardware, a second message including a MAC having the first MAC length. The method also includes transmitting the second message to the base station.

Another example implementation of these techniques is a method in a base station that supports a plurality of MAC lengths for integrity protection of wireless communications. The method includes determining, by processing hardware, that a first MAC length of the plurality of MAC lengths is to be used for integrity protection; generating, by the processing hardware, a first message including an information element indicating that the first MAC length is to be used for integrity protection, and transmitting the first message to a user device. The method also includes, after transmitting the first message, receiving, by the processing hardware and from the user device, a second message including a MAC. The method further includes computing, by the processing hardware, an expected MAC having the first MAC length, and comparing, by the processing hardware, the expected MAC to the MAC in the second message to verify that the MAC in the second message is a valid MAC.

Still another example implementation of these techniques is a non-transitory medium storing thereon instructions. When executed by processing hardware of a user device that supports a plurality of MAC lengths for integrity protection of wireless communications, the instructions cause the user device to receive, from a base station, a first message including an information element; determine, based on the information element, that a first MAC length of the plurality of MAC lengths is to be used for integrity protection; and, after determining that the first MAC length is to be used for integrity protection, generate a second message including a MAC having the first MAC length. The instructions also cause the user device to transmit the second message to the base station.

Yet another example implementation of these techniques is a method in one or more core network elements (e.g., one or more servers and/or other computing devices). The method includes receiving, by processing hardware and from either a first base station or a second base station, a first message including a first information element. The method also includes determining, by processing hardware and based on the first information element, that a user device supports a first MAC length, of a plurality of MAC lengths supported by the first base station, for integrity protection. The method also includes generating, by the processing hardware, a second message including a second information element indicating that the first MAC length is to be used for integrity protection of wireless communications between the first base station and the user device. The method also includes transmitting the second message to the first base station to configure the first base station to use the first MAC length for wireless communications with the user device.

DETAILED DESCRIPTION OF THE DRAWINGS

Generally speaking, the techniques of this disclosure allow a user device (UE) and a base station to use a consistent message authentication code (MAC) length for integrity protection, thereby allowing for the authentication/verification of messages in a wireless communication network. Thus, the disclosed techniques avoid scenarios in which communications cannot proceed due to lack of authentication. Moreover, the disclosed techniques may avoid sub-optimal system designs in which all user devices and base stations must use a default, relatively short MAC length, regardless of their MAC length capabilities. Thus, integrity protection may be strengthened in scenarios where the user device and base station both support more robust integrity protection.

These techniques are discussed below with example reference to a fifth-generation (5G) radio access ("NR") network and, at times, an Evolved Universal Terrestrial Radio Access (EUTRA) network. Further, the examples relate to a 5G core network (5GC). However, the techniques of this disclosure can apply to other radio access and/or core network technologies.

Figure 1:
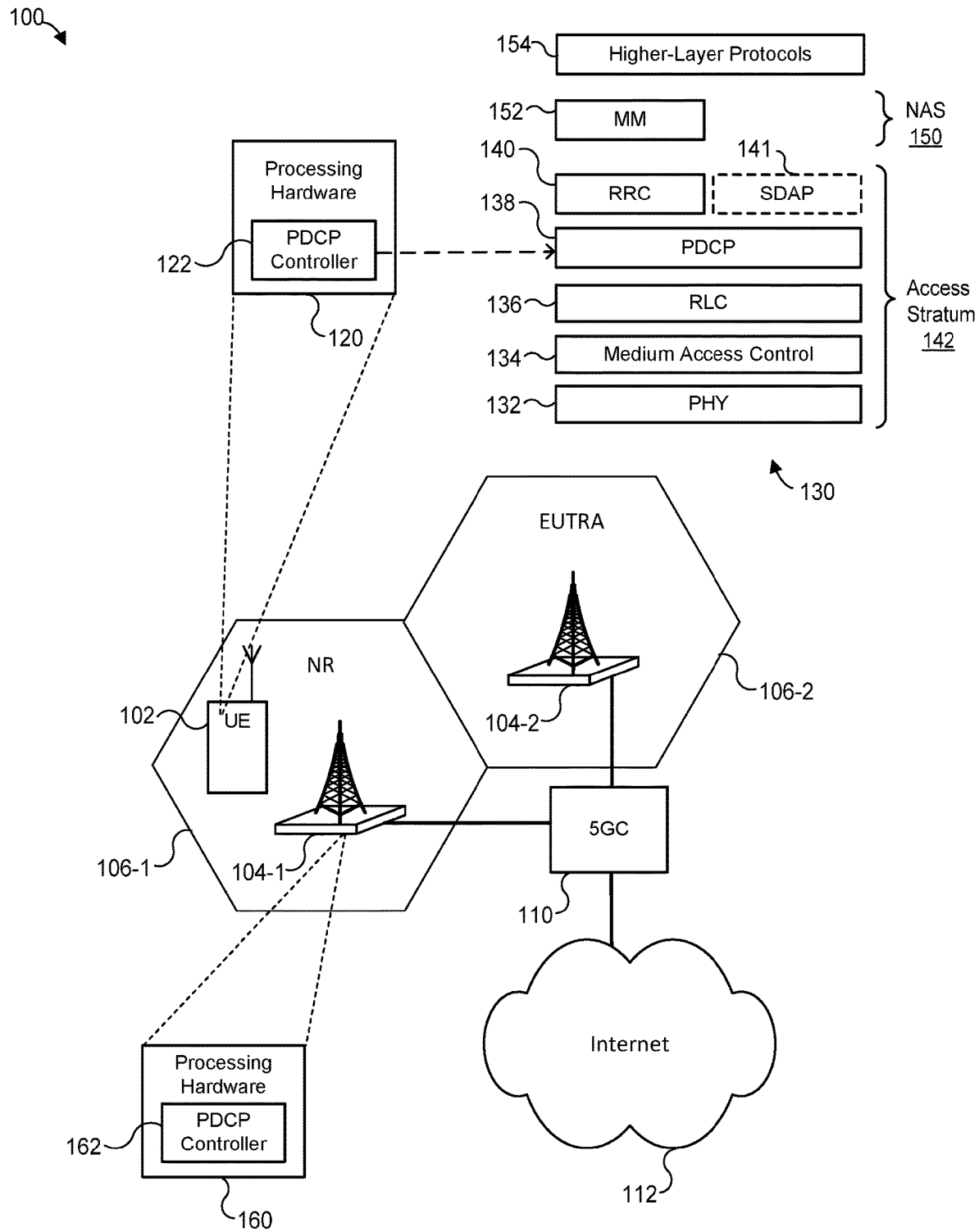
FIG. 1 is a block diagram of an example wireless communication network in which a user device and base station of this disclosure support multiple message authentication code (MAC) lengths for integrity protection.

Referring first to FIG. 1, a UE 102 can operate in an example wireless communication network 100. The wireless communication network 100 includes base stations 104-1 and 104-2, associated with respective cells 106-1 and 106-2. While FIG. 1 depicts each of base stations 104-1 and 104-2 as serving only one cell, it is understood that the base station 104-1 and/or the base station 104-2 may also cover one or more additional cells not shown in FIG. 1. In general, the wireless communication network 100 can include any number of base stations, and each of the base stations can cover one, two, three, or any other suitable number of cells.

The base station 104-1 may operate as a 5G Node B (gNB), and the base station 104-2 may operate as a next-generation evolved Node B (ng-eNB), for example. As seen in FIG. 1, the base station 104-1 and the base station 104-2 are both connected to a 5GC 110, which is in turn connected to the Internet 112. In other scenarios, the base station 104-2 may not be connected directly to the 5GC 110 (e.g., the base station 104-2 may connect to another core network not shown in FIG. 1, which in turn communicates with the 5GC 110). In various alternative implementations and/or scenarios, the wireless communication network 100 does not include the base station 104-2 and/or the cell 106-2, or the base station 104-2 is another gNB and the cell 106-2 is another NR cell, etc.

The UE 102 can support an NR air interface, and exchange messages with the base station 104-1 when operating in the NR cell 106-1. In some implementations, the UE 102 also can support a EUTRA air interface, and exchange messages with the base station 104-1 over 5G NR when operating in the NR cell 106-1, and with the base station 104-2 over EUTRA when operating in the EUTRA cell 106-2. The UE 102 in still other implementations can support only EUTRA. As discussed below, the UE 102 can be any suitable device capable of wireless communications.

The UE 102 is equipped with processing hardware 120, which can include one or more general-purpose processors (e.g., CPUs) and a non-transitory computer-readable memory storing instructions that the one or more general-purpose processors can execute. Additionally or alternatively, the processing hardware 120 can include special-purpose processing units, such as a wireless communication chipset, for example. The processing hardware 120 includes a packet data convergence protocol (PDCP) controller 122. The PDCP controller 122 is responsible for inbound messaging, outbound messaging, and internal procedures at the corresponding layer of a wireless communication protocol stack 130. For example, the PDCP controller 122 is configured to package and interpret PDCP protocol data units (PDUs) that embed messages from other layers, such as radio resource control (RRC) messages. While not shown in FIG. 1, the processing hardware 120 may also include a controller for each of a number of other layers, such as an RRC controller and/or a mobility management (MM) controller.

The PDCP controller 122 can be implemented using any suitable combination of hardware, software, and/or firmware. In one example implementation, the PDCP controller 122 is a set of instructions that defines respective components of the operating system of the UE 102, and one or more CPUs of the processing hardware 120 execute these instructions to perform the respective PDCP functions. In another implementation, the PDCP controller 122 is implemented using firmware as a part of a wireless communication chipset.

The protocol stack 130, illustrated in a simplified manner in FIG. 1, includes a physical layer 132 (commonly abbreviated as PHY), a medium access control layer 134 (with medium access control not being abbreviated as "MAC" herein, to avoid confusion), a radio link control (RLC) layer 136, a PDCP layer 138, an RRC layer 140, and possibly a service data adaptation protocol (SDAP) layer 141, as parts of an access stratum 142. A non-access stratum (NAS) 150 of the protocol stack 130 includes, among other layers, one or more MM layers 160 for handling registration, attachment, or tracking area update procedures.

As further illustrated in FIG. 1, the protocol stack 130 also supports higher-layer protocols 154 for various services and applications. For example, the higher-layer protocols 154 may include Internet Protocol (IP), Transmission Control Protocol and User Datagram Protocol (UDP). The PDCP controller 122 is configured to package and interpret PDCP protocol data units (PDUs) that embed data packets of higher-layer protocols, including the RRC layer 140 and the higher-layer protocols 154. The various layers 132, 134, 136, 138, 140, 141, 152 and 154 may be ordered as shown in FIG. 1. It is understood, however, that in some implementations and/or situations, one or more of the depicted layers may operate in a manner that does not strictly conform to the ordering shown in FIG. 1.

The base station 104-1 is equipped with processing hardware 160, which can include one or more general-purpose processors (e.g., CPUs) and a non-transitory computer-readable memory storing instructions that the one or more general-purpose processors can execute. Additionally or alternatively, the processing hardware 160 can include special-purpose processing units, such as a wireless communication chipset, for example. Similar to the processing hardware 120 of UE 102, the processing hardware 160 includes a PDCP controller 162. While the PDCP controller 122 of the UE 102 implements functionality of the PDCP layer 138 on the user device side, however, the PDCP controller 162 of the base station 104-1 implements functionality of the PDCP layer 138 on the base station side. While not shown in FIG. 1, the processing hardware 160 may also include a controller for each of a number of other layers, such as an RRC controller and/or an MM controller.

The PDCP controller 162 can be implemented using any suitable combination of hardware, software, and/or firmware. In one example implementation, the PDCP controller 162 is a set of instructions that defines respective components of the operating system of the base station 102, and one or more CPUs of the processing hardware 160 execute these instructions to perform the respective PDCP functions. In another implementation, the PDCP controller 162 is implemented using firmware as a part of a wireless communication chipset. In some implementations, the base station 104-2 includes processing hardware similar to the processing hardware 160 of the base station 104-1, but specifically configured to operate in the EUTRA cell 106-2 rather than the NR cell 106-1. In other implementations, the base station 104-2 may be co-located with the base station 104-2 and share some of the processing hardware 160 of the base station 104-1.

To form a PDCP PDU for transmission, the PDCP controller 122 or PDCP controller 162 prepends a PDCP header to the payload that is to be transmitted within the PDCP PDU (e.g., a data packet or an RRC PDU including an RRC message) and, to provide integrity protection, appends an access stratum MAC (referred to herein as a "MAC-I") to the payload. For ease of explanation, references herein to the content of PDCP PDUs may not explicitly mention the PDCP header. While the various example implementations discussed below include a MAC-I at the end of a PDCP PDU, it is understood that in other implementations the MAC-I may instead be at a different location within the PDCP PDU, or may be included in a data unit other than a PDCP PDU. In the following description, any reference to a PDCP PDU including or containing an RRC message is understood to mean that the PDCP PDU includes an RRC PDU, which in turn includes the RRC message.

The PDCP controller 122 or PDCP controller 162 computes the MAC-I for the PDCP PDU by using an integrity algorithm that operates upon various parameters having particular values, such as the "NIA" algorithm referred to in the 3GPP TS 38.331 v15.4.0. When receiving a PDCP PDU, the PDCP controller 122 or PDCP controller 162 calculates an "expected" MAC-I (referred to herein as an XMAC-I) using the same (e.g., NIA) algorithm and, if the sender/message is to be properly authenticated/verified, the same parameters and parameter values. The PDCP controller 122 or PDCP controller 162 compares the XMAC-I to the MAC-I of the received PDCP PDU, and verifies the authenticity of the message contained in the PDCP PDU if and only if the XMAC-I matches the MAC-I. The UE 102 or base station 104-1 may ignore and/or discard a message that cannot be verified, for example. In some implementations, the PDCP controller 122 or PDCP controller 162 computes the MAC-I or the XMAC-I by using the integrity algorithm that operates upon the various parameters and the payload, or operates upon the various parameters, a PDCP header of the PDCP PDU, and the payload.

The NIA algorithm, for example, operates upon (i.e., accepts as input) a "COUNT" parameter value, a "DIRECTION" parameter value, a "BEARER" parameter value, a "KEY" parameter value, and the message itself. The "DIRECTION" parameter has a binary value that reflects the direction of transmission (e.g., "0" for uplink or "1" for downlink), and the "BEARER" parameter has a 5-bit value that reflects the radio bearer identity. In some implementations, the PDCP controller 122 may derive the KEY parameter value based on a Security Mode Command message or an RRC Reconfiguration message received from the base station 104-1. Similarly, the PDCP controller 162 may derive the KEY parameter value based on the Security Mode Command message or the RRC Reconfiguration message that the base station 104-1 transmits. In some implementations, the KEY parameter value is different for user plane and control plane messages.

As will be discussed in greater detail below, the PDCP controller 122 of UE 102 and the PDCP controller 162 of base station 104-1 each support at least two MAC-I lengths, including a shorter MAC-I (referred to herein as a "short MAC-I") and a longer MAC-I (referred to herein as a "long MAC-I"). For example, a short MAC-I may be a 32-bit MAC-I, while a long MAC-I may be a 64-bit, 128-bit or 256-bit MAC-I. For any given implementation or scenario discussed herein, it is understood that each reference to a "short" MAC-I (or XMAC-I) denotes a first constant bit length, and that each reference to a "long" MAC-I (or XMAC-I) denotes a second constant bit length. Thus, for example, if reference is made to two messages each containing a short MAC-I, for a particular implementation/scenario, it is understood that both of those MAC-Is have the same bit length. In alternative implementations, PDCP control 122 and/or PDCP controller 162 also support additional MAC-I lengths (e.g., and intermediate length MAC-I).

In some implementations, the PDCP controller 122 and PDCP controller 162 each use a larger size COUNT parameter (i.e., a COUNT parameter value having more bits) when computing a long MAC-I or XMAC-I, and a smaller size COUNT parameter (i.e., a COUNT parameter value having fewer bits) when computing a short MAC-I or XMAC-I. The following table provides examples of bit lengths for input parameters of the NIA algorithm, according to various implementations. For example, the UE 102 and base station 104-1 may support both the combination of parameter lengths shown in Example 1 (for the short MAC-I), and the combination of parameter lengths shown in any one of Examples 2 through 13 (for the long MAC-I):

| Example | MAC-I type | KEY | COUNT | DIRECTION | BEARER |
|---|---|---|---|---|---|
| 1 | 32-bit Short MAC-I | 128 bits | 32 bits | 1 bit | 5 bits |
| 2 | 64-bit long MAC-I | 128 bits | 32 bits | 1 bit | 5 bits |
| 3 | 64-bit long MAC-I | 128 bits | 64 bits | 1 bit | 5 bits |
| 4 | 128-bit long MAC-I | 128 bits | 32 bits | 1 bit | 5 bits |
| 5 | 128-bit long MAC-I | 128 bits | 64 bits | 1 bit | 5 bits |
| 6 | 128-bit long MAC-I | 128 bits | 128 bits | 1 bit | 5 bits |
| 7 | 256-bit long MAC-I | 128 bits | 32 bits | 1 bit | 5 bits |
| 8 | 256-bit long MAC-I | 128 bits | 64 bits | 1 bit | 5 bits |
| 9 | 256-bit long MAC-I | 128 bits | 128 bits | 1 bit | 5 bits |
| 10 | 256-bit long MAC-I | 256 bits | 32 bits | 1 bit | 5 bits |
| 11 | 256-bit long MAC-I | 256 bits | 64 bits | 1 bit | 5 bits |
| 12 | 256-bit long MAC-I | 256 bits | 128 bits | 1 bit | 5 bits |
| 13 | 256-bit long MAC-I | 256 bits | 256 bits | 1 bit | 5 bits |

In some implementations where the bit length of the COUNT parameter differs for the short MAC-I and long MAC-I, the UE 102 and base station 104-1 use the COUNT (e.g., if Examples 1 and 3 above are both supported), the PDCP controller 122 of UE 102 and the PDCP controller 162 of base station 104-1 use the COUNT size for the long MAC-I for an RRC message or a data packet if the base station 104-1 configures the UE 102 to use a long MAC-I (as discussed below), and instead use the COUNT size for the short MAC-I for the RRC message or data packet if the base station 104-1 does not configure the UE 102 to use a long MAC-I. In other implementations, the PDCP controller 122 of UE 102 and the PDCP controller 162 of base station 104-1 use the same COUNT size regardless of the MAC-I size (e.g., if Examples 1 and 2 above are both supported).

For simplicity, FIG. 1 does not depict various components of the UE 102 and the base station 104-1. In addition to the layer-specific controllers mentioned above, for example, the UE 102 and the base station 104-1 include respective transceivers, which comprise various hardware, firmware, and software components that are configured to transmit and receive wireless signals according to the NR air interface. The processing hardware 120 and the processing hardware 160 can send commands and exchange information with the respective transceivers as needed to perform various connection establishment procedures, perform various RRC or MM procedures, or communicate with other network elements, etc.

Example message sequences and methods that the UE 102 and/or base station 104-1 can implement and execute, alone or in combination with other components of the network 100, will now be discussed with reference to FIGS. 2A-11. The UE 102 and/or base station 104-1 can implement at least some of the acts described below in software, firmware, hardware, or any suitable combination of software, firmware, and hardware. Although FIGS. 2A-11 are discussed below with reference to the components depicted in FIG. 1 and a 5G system (e.g., with the base station 104-1 being a gNB), in general any suitable components or wireless communication network may be used. Furthermore, although FIGS. 2A-11 are discussed below with reference to implementations in which the UE 102 and base station 104-1 only use and/or support two MAC-I lengths (i.e., a short MAC-I and a long MAC-I), in other implementations the UE 102 and base station 104-1 support three or more MAC-I lengths.

Figure 2A:
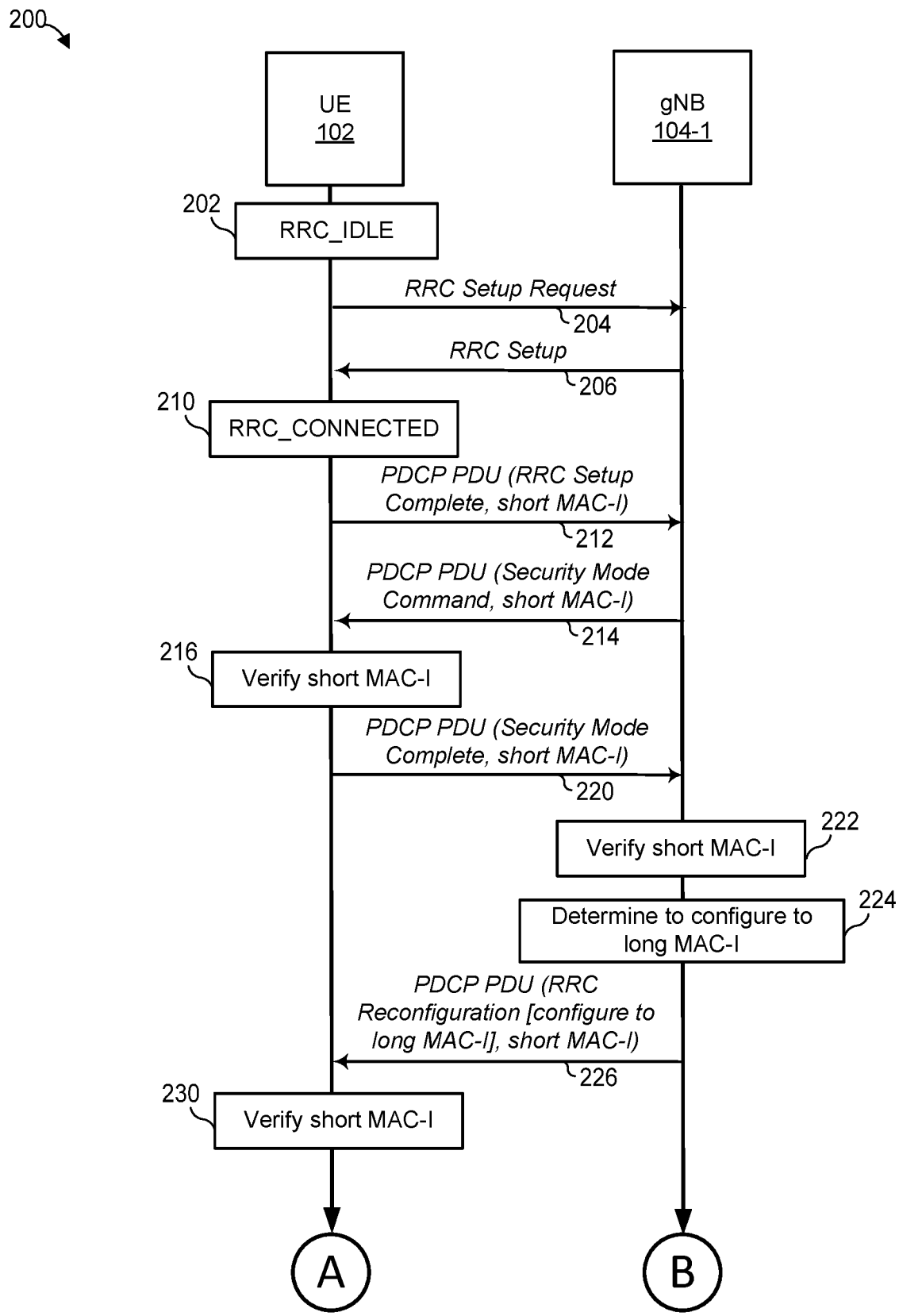
FIGS. 2A-9B depict various messaging sequence related to MAC transmission that may occur in the wireless communication network of FIG. 1.
Figure 2B:
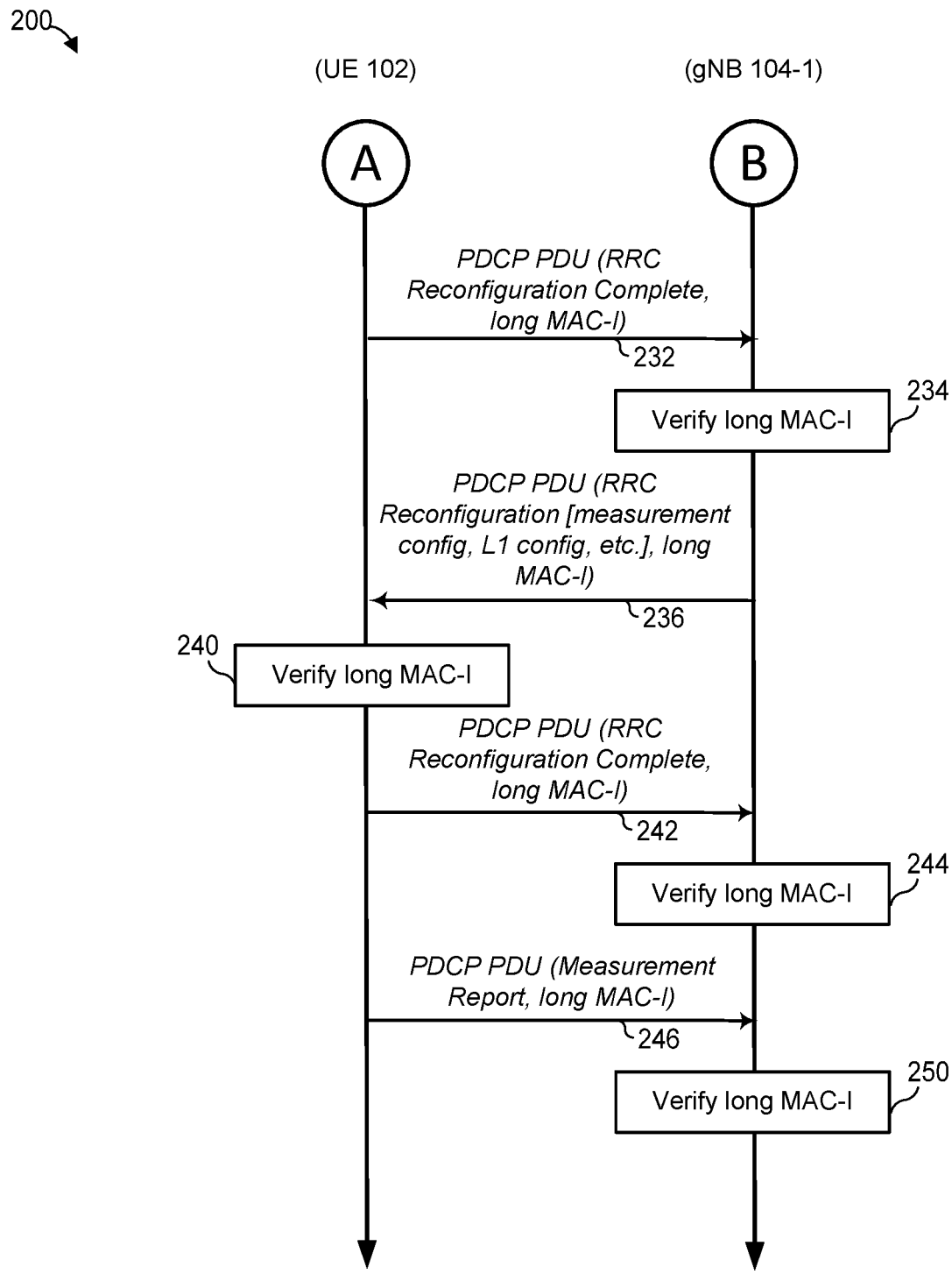

Referring first to FIGS. 2A and 2B, a messaging diagram 200 depicts example messages that may be exchanged between the UE 102 and the base station 104-1 of FIG. 1, according to one implementation and scenario. In some implementations and/or scenarios, at the beginning of the message sequence depicted in FIGS. 2A and 2B, the base station 104-1 does not yet know that the UE 102 supports a long MAC-I, and/or the UE 102 does not yet know that the base station 104-1 supports a long MAC-I.

In the messaging diagram 200, after the UE 102 enters 202 an RRC_IDLE state, the UE 102 initiates an RRC establishment/setup procedure by transmitting 204 an RRC Setup Request message to the base station 104-1. In response, the base station 104-1 transmits 206 an RRC Setup message to the UE 102. In the depicted implementation, the RRC Setup Request and RRC Setup messages do not use the PDCP protocol (i.e., both messages bypass the PDCP layer 138), and thus are not included in PDCP PDUs. In response to the RRC Setup message, the UE 102 enters 210 an RRC_CONNECTED state.

Thereafter, the PDCP controller 122 of UE 102 generates a PDCP PDU containing an RRC Setup Complete message and a short (e.g., 32-bit) MAC-I. In one implementation, because the base station 104-1 has not yet configured the UE 102 to activate integrity protection, the PDCP controller 122 of UE 102 sets all bits of the short MAC-I to zeros, or to some other default value. The UE 102 then transmits 212 the PDCP PDU containing the RRC Setup Complete message and the short MAC-I to the base station 104-1.

After receiving the RRC Setup Complete message, the PDCP controller 162 of base station 104-1 generates a PDCP PDU containing a Security Mode Command message and a short MAC-I. The PDCP controller 162 may compute the short MAC-I using an integrity protection algorithm indicated by an RRC field (e.g., an integrityProtAlgorithm field) that is included in the Security Mode Command message, and also using a key associated with the algorithm (e.g., the $K_{RRCint}$ key of 3GPP TS 33.501). The PDCP controller 162 may compute the short MAC-I using the NIA algorithm discussed above, for example. The base station 104-1 then transmits 214 the PDCP PDU containing the Security Mode Command message and the short MAC-I to the UE 102.

After the UE 102 receives the PDCP PDU containing the Security Mode Command message and the short MAC-I, the PDCP controller 122 of UE 102 verifies 216 the short MAC-I to authenticate the received message. To this end, the PDCP controller 122 derives the key associated with the algorithm indicated in the Security Mode Command Message (e.g., the $K_{RRCint}$ key associated with the integrityProtAlgorithm), and uses the indicated algorithm and derived key to compute a short XMAC-I. The PDCP controller 122 may default to the short MAC-I/XMAC-I format in the absence of a different command or configuration from the base station 104-1, for example. The PDCP controller 122 compares the short MAC-I in the received PDCP PDU to the computed short XMAC-I. If the MAC-I and XMAC-I match, the UE 102 has successfully verified the received Security Mode Command message.

FIGS. 2A and 2B depict a scenario in which the UE 102 successfully verifies 216 the Security Mode Command message. Unsuccessful verification (at any time in this sequence) may result in the UE 102 discarding the message or, in some situations, requesting termination of the connection between the UE 102 and the base station 104-1. Therefore, the PDCP controller 122 of UE 102 generates a PDCP PDU containing a Security Mode Complete message and a short MAC-I. The PDCP controller 122 may compute the short MAC-I using the same integrity protection algorithm that was indicated by the field of the Security Mode Command message, and also using a key associated with the algorithm (e.g., the $K_{RRCint}$ key). The PDCP controller 122 may compute the short MAC-I using the NIA algorithm discussed above, for example. The UE 102 then transmits 220 the PDCP PDU containing the Security Mode Complete message and the short MAC-I to the base station 104-1. In other scenarios, where the PDCP controller 122 cannot successfully verify the Security Mode Command message, the UE 102 does not generate and/or send the PDCP PDU containing the Security Mode Complete message.

After the base station 104-1 receives the PDCP PDU containing the Security Mode Complete message and the short MAC-I, the PDCP controller 162 of base station 104-1 verifies 222 the short MAC-I to authenticate the received message. To this end, the PDCP controller 162 uses the same algorithm and key (e.g., the integrityProtAlgorithm and $K_{RRCint}$ key) to compute a short XMAC-I. The PDCP controller 162 compares the short MAC-I in the received PDCP PDU to the computed short XMAC-I. If the MAC-I and XMAC-I match, the base station 104-1 has successfully verified the received Security Mode Complete message.

If the base station 104-1 fails to successfully verify the short MAC-I for the Security Mode Complete message, the base station 104-1 may transmit an RRC Release message to the UE 102 to terminate the connection between the UE 102 and the base station 104-1. However, FIGS. 2A and 2B depict a scenario in which the base station 104-1 successfully verifies 222 the Security Mode Complete message. In this scenario, at some time after the verification, the base station 104-1 determines 224 to configure to use the long (e.g., 64-bit, 128-bit or 256-bit) MAC-I format. This determination may occur after the base station 104-1 learns that the UE 102 supports the long MAC-I format, for example, as discussed in further detail below (e.g., in connection with FIG. 5).

After (e.g., in response to) determining 224 to configure to use the long MAC-I format, the base station 104-1 includes a security configuration (indicating the long MAC-I format) in an RRC Reconfiguration message. The PDCP controller 162 of base station 104-1 generates a PDCP PDU containing the RRC Reconfiguration message and a short MAC-I. The PDCP controller 162 may compute the short MAC-I using the same algorithm and key (e.g., the integrityProtAlgorithm and $K_{RRCint}$ key). The PDCP controller 162 may compute the short MAC-I using the NIA algorithm discussed above, for example. The base station 104-1 then transmits 226 the PDCP PDU containing the RRC Reconfiguration message and the short MAC-I to the UE 102.

After the UE 102 receives the PDCP PDU containing the RRC Reconfiguration message and the short MAC-I, the PDCP controller 122 of UE 102 verifies 230 the short MAC-I (as discussed above for verification 216) to authenticate the received message. FIGS. 2A and 2B depict a scenario in which the UE 102 successfully verifies 230 the RRC Reconfiguration message. Therefore, in response to the UE 102 determining that the long MAC-I format is to be used based on the security configuration and/or RRC Reconfiguration message, the UE 102 determines to begin using the long MAC-I format for subsequent RRC messages exchanged between the UE 102 and the base station 104-1 over a signaling radio bearer (SRB).

In some implementations, successful verification (by the UE 102) of the RRC Reconfiguration message that was transmitted 226 by the base station 104-1 only causes the UE 102 to change to the long MAC-I format for RRC messages exchanged between UE 102 and base station 104-1 over a subset of (e.g., one of) a plurality of SRBs. For example, the UE 102 may apply the long MAC-I format for RRC messages sent over a first SRB (e.g., "SRB 1") but not for RRC messages sent over a second SRB (e.g., "SRB 2"). The UE 102 may instead continue to use the short MAC-I format for RRC messages sent over the second SRB (e.g., until configured otherwise by the base station 104-1). In other implementations, the UE 102 may change to the long MAC-I format for RRC messages sent over all SRBs.

Moreover, in some implementations, successful verification (by the UE 102) of the RRC Reconfiguration message that was transmitted 226 by the base station 104-1 causes the UE 102 to change to the long MAC-I format for data packets exchanged between UE 102 and base station 104-1 over one or more data radio bearers (DRBs), in addition to (or instead of) RRC messages exchanged over one or more SRBs. Alternatively, the UE 102 may change to the long MAC-I format only for RRC messages sent over SRBs (or a subset of all SRBs, if more than one) but not for data packets sent over any DRB. For example, the UE 102 may instead use the short MAC-I format for data packets sent over DRBs.

In the scenario of FIGS. 2A and 2B, after the verification 230, the PDCP controller 122 of UE 102 generates a PDCP PDU containing an RRC Reconfiguration Complete message and a long MAC-I. The PDCP controller 122 may compute the long MAC-I using the same integrity protection algorithm that was indicated by the field of the Security Mode Command message, and possibly also the same key associated with the algorithm (e.g., the $K_{RRCInt}$ key). If the security configuration and/or RRC Reconfiguration message indicates a different algorithm for integrity protection, however, the PDCP controller 122 may use that algorithm (e.g., with the $K_{RRCint}$ key). The UE 102 then transmits 232 the PDCP PDU containing the RRC Reconfiguration Complete message and the long MAC-I to the base station 104-1, and the base station 104-1 verifies 234 the long MAC-I for the RRC Reconfiguration Complete message using the same integrity protection algorithm and key that the UE 102 had used to compute the long MAC-I.

The example scenario of FIGS. 2A and 2B also includes the transmission of other RRC messages to which the UE 102 or base station 104-1 appends a long MAC-I. For example, the base station 104-1 generates and transmits 236 a PDCP PDU containing another RRC Reconfiguration message (e.g., with fields for measurement configuration, L1 configuration, medium access control configuration, RLC configuration and/or radio bearer configuration) and a long MAC-I (which the UE 102 verifies 240), the UE 102 generates and transmits 242 a PDCP PDU containing another RRC Reconfiguration Complete message with a long MAC-I (which the base station 104-1 verifies 244), and the UE 102 generates and transmits 246 a PDCP PDU containing a Measurement Report message with a long MAC-I (which the base station 104-1 verifies 250). In some implementations, if the base station 104-1 fails to successfully verify the short MAC-I or long MAC-I for any RRC message received from the UE 102, the base station 104-1 transmits an RRC Release message to the UE 102 to terminate the connection between the UE 102 and the base station 104-1.

Figure 3A:
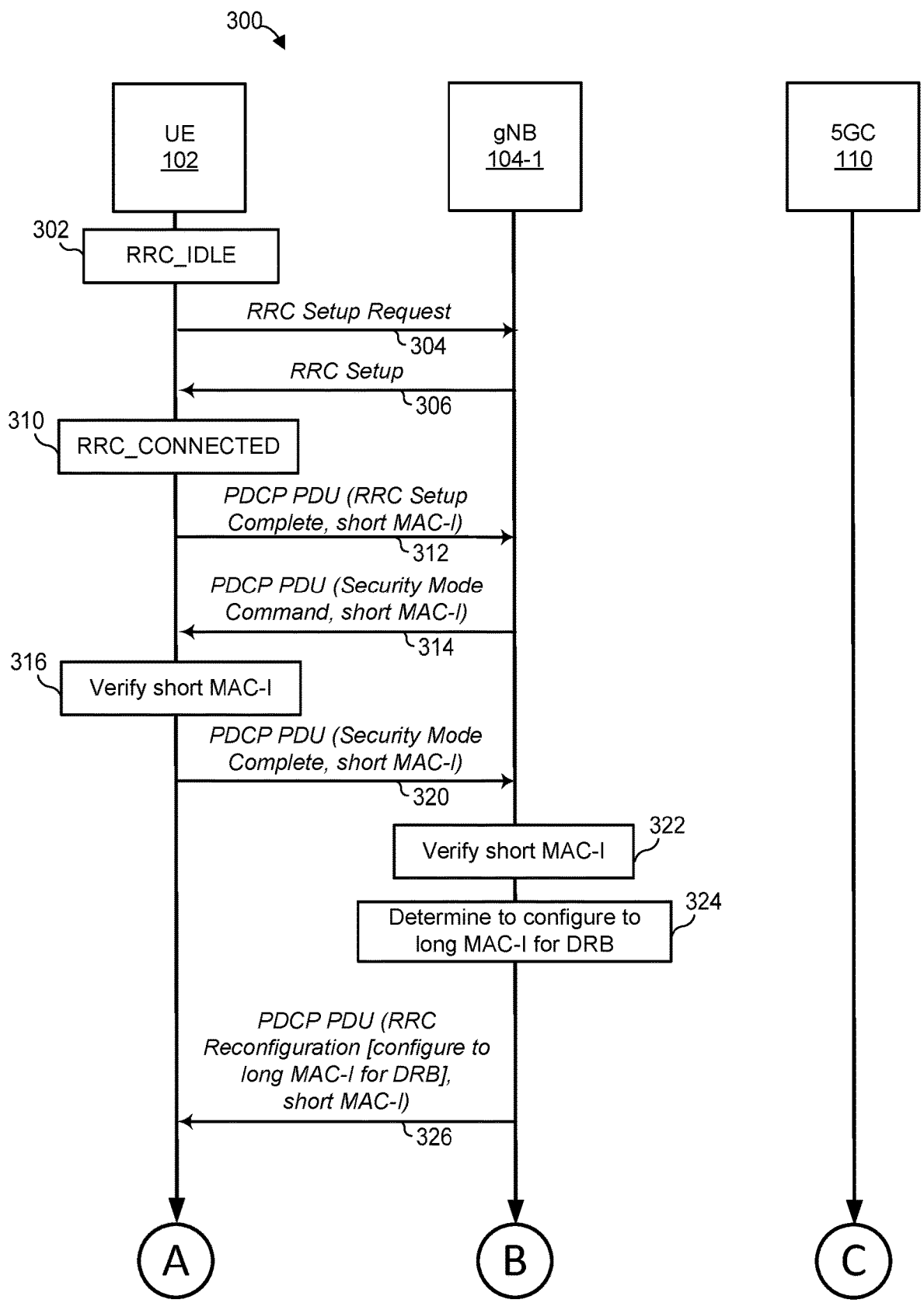
Figure 3B:
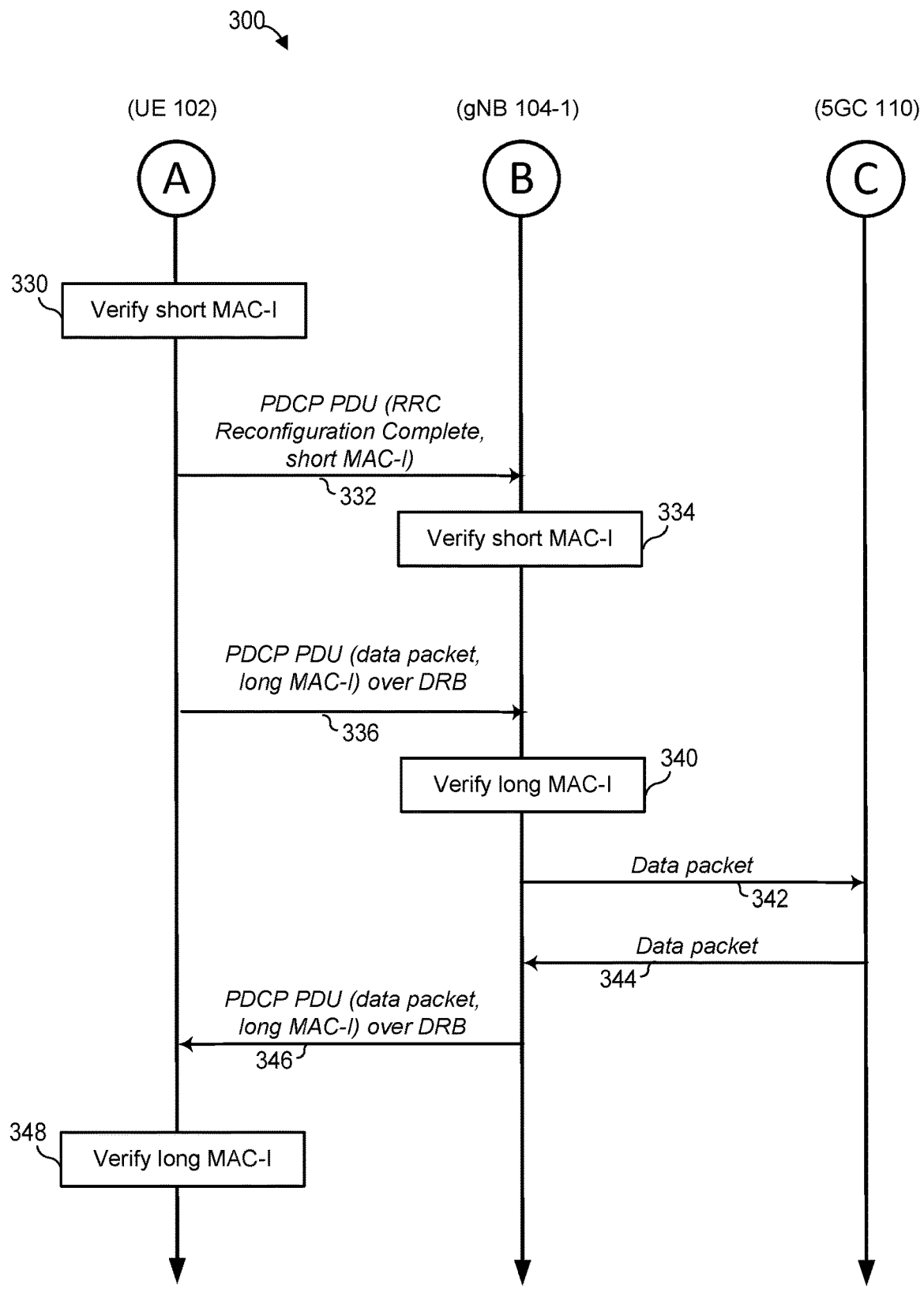

Referring next to FIGS. 3A and 3B, a messaging diagram 300 depicts example messages that may be exchanged between the UE 102, base station 104-1 and 5GC 110 of FIG. 1, according to another implementation and/or scenario. In some implementations and/or scenarios, at the beginning of the message sequence depicted in FIGS. 3A and 3B, the base station 104-1 does not yet know that the UE 102 supports a long MAC-I, and/or the UE 102 does not yet know that the base station 104-1 supports a long MAC-I.

In the messaging diagram 300, after the UE 102 enters 302 an RRC_IDLE state, the UE 102 initiates an RRC establishment/setup procedure by transmitting 304 an RRC Setup Request message to the base station 104-1. In response, the base station 104-1 transmits 306 an RRC Setup message to the UE 102. In the depicted implementation, the RRC Setup Request and RRC Setup messages do not use the PDCP protocol (i.e., both messages bypass the PDCP layer 138), and thus are not included in PDCP PDUs. In response to the RRC Setup message, the UE 102 enters 310 an RRC_CONNECTED state.

Thereafter, the PDCP controller 122 of UE 102 generates a PDCP PDU containing an RRC Setup Complete message and a short (e.g., 32-bit) MAC-I. In one implementation, because the base station 104-1 has not yet configured the UE 102 to activate integrity protection, the PDCP controller 122 of UE 102 sets all bits of the short MAC-I to zeros, or to some other default value. The UE 102 then transmits 312 the PDCP PDU containing the RRC Setup Complete message and the short MAC-I to the base station 104-1.

After receiving the RRC Setup Complete message, the PDCP controller 162 of base station 104-1 generates a PDCP PDU containing a Security Mode Command message and a short MAC-I. The PDCP controller 162 may compute the short MAC-I using an integrity protection algorithm indicated by an RRC field (e.g., an integrityProtAlgorithm field) that is included in the Security Mode Command message, and also using a key associated with the algorithm (e.g., the $K_{RRCint}$ key of 3GPP TS 33.501). The PDCP controller 162 may compute the short MAC-I using the NIA algorithm discussed above, for example. The base station 104-1 then transmits 314 the PDCP PDU containing the Security Mode Command message and the short MAC-I to the UE 102.

After the UE 102 receives the PDCP PDU containing the Security Mode Command message and the short MAC-I, the PDCP controller 122 of UE 102 verifies 316 the short MAC-I to authenticate the received message. To this end, the PDCP controller 122 derives the key associated with the algorithm indicated in the Security Mode Command Message (e.g., the $K_{RRCint}$ key associated with the integrityProtAlgorithm), and uses the indicated algorithm and derived key to compute a short XMAC-I. The PDCP controller 122 may default to the short MAC-I/XMAC-I format in the absence of a different command or configuration from the base station 104-1, for example. The PDCP controller 122 compares the short MAC-I in the received PDCP PDU to the computed short XMAC-I. If the MAC-I and XMAC-I match, the UE 102 has successfully verified the received Security Mode Command message.

FIGS. 3A and 3B depict a scenario in which the UE 102 successfully verifies 316 the Security Mode Command message. Unsuccessful verification (at any time in this sequence) may result in the UE 102 discarding the message or, in some situations, requesting termination of the connection between the UE 102 and the base station 104-1. Therefore, the PDCP controller 122 of UE 102 generates a PDCP PDU containing a Security Mode Complete message and a short MAC-I. The PDCP controller 122 may compute the short MAC-I using the same integrity protection algorithm that was indicated by the field of the Security Mode Command message, and also using a key associated with the algorithm (e.g., the $K_{RRCint}$ key). The PDCP controller 122 may compute the short MAC-I using the NIA algorithm discussed above, for example. The UE 102 then transmits 320 the PDCP PDU containing the Security Mode Complete message and the short MAC-I to the base station 104-1. In other scenarios, where the PDCP controller 122 cannot successfully verify the Security Mode Command message, the UE 102 does not generate and/or send the PDCP PDU containing the Security Mode Complete message.

After the base station 104-1 receives the PDCP PDU containing the Security Mode Complete message and the short MAC-I, the PDCP controller 162 of base station 104-1 verifies 322 the short MAC-I to authenticate the received message. To this end, the PDCP controller 162 uses the same algorithm and key (e.g., the integrityProtAlgorithm and $K_{RRCint}$ key) to compute a short XMAC-I. The PDCP controller 162 compares the short MAC-I in the received PDCP PDU to the computed short XMAC-I. If the MAC-I and XMAC-I match, the base station 104-1 has successfully verified the received Security Mode Complete message.

If the base station 104-1 fails to successfully verify the short MAC-I for the Security Mode Complete message, the base station 104-1 may transmit an RRC Release message to the UE 102 to terminate the connection between the UE 102 and the base station 104-1. However, FIGS. 3A and 3B depict a scenario in which the base station 104-1 successfully verifies 322 the Security Mode Complete message. In this scenario, at some time after the verification, the base station 104-1 determines 324 to configure to use the long (e.g., 64-bit, 128-bit or 256-bit) MAC-I format specifically for a DRB of the UE 102. This determination may occur after the base station 104-1 learns that the UE 102 supports the long MAC-I format, for example, as discussed in further detail below (e.g., in connection with FIG. 5).

After (e.g., in response to) determining 324 to configure to use the long MAC-I format for the DRB, the base station 104-1 includes a security configuration (indicating the long MAC-I format for the DRB) in an RRC Reconfiguration message. The PDCP controller 162 of base station 104-1 generates a PDCP PDU containing the RRC Reconfiguration message and a short MAC-I. The PDCP controller 162 may compute the short MAC-I using the same algorithm and key (e.g., the integrityProtAlgorithm and $K_{RRCint}$ key). The PDCP controller 162 may compute the short MAC-I using the NIA algorithm discussed above, for example. The base station 104-1 then transmits 326 the PDCP PDU containing the RRC Reconfiguration message and the short MAC-I to the UE 102.

After the UE 102 receives the PDCP PDU containing the RRC Reconfiguration message and the short MAC-I, the PDCP controller 122 of UE 102 verifies 330 the short MAC-I (as discussed above for verification 316) to authenticate the received message. FIGS. 3A and 3B depict a scenario in which the UE 102 successfully verifies 330 the RRC Reconfiguration message. Therefore, in response to the UE 102 determining that the long MAC-I format is to be used for the DRB of the UE 102 (based on the security configuration and/or RRC Reconfiguration message), the UE 102 determines to begin using the long MAC-I format for subsequent data packets exchanged between the UE 102 and the base station 104-1 over the DRB.

In the example scenario of FIGS. 3A and 3B, after the verification 330, the PDCP controller 122 of UE 102 generates a PDCP PDU containing an RRC Reconfiguration Complete message and a short MAC-I. That is, FIGS. 3A and 3B reflect an implementation in which the configuration to long MAC-I format does not apply to RRC messages exchanged between UE 102 and base station 104-1 over SRBs. In some implementations, however, the PDCP controller 122 computes the short MAC-I using the same integrity protection algorithm that was indicated by the field of the Security Mode Command message, and possibly also the same key associated with the algorithm (e.g., the $K_{RRCint}$ key). The UE 102 then transmits 332 the PDCP PDU containing the RRC Reconfiguration Complete message and the short MAC-I to the base station 104-1, and the base station 104-1 verifies 334 the short MAC-I for the RRC Reconfiguration Complete message using the same integrity protection algorithm and key that the UE 102 had used to compute the short MAC-I.

Also in the scenario of FIGS. 3A and 3B, when the UE 102 needs to send some data (e.g., data relating to layers 154) via the DRB, the PDCP controller 122 of UE 102 generates a PDCP PDU (or, in some implementations, an SDAP PDU) containing a data packet and a long MAC-I. The data packet may be an Internet Protocol (IP) packet, for example. If the base station 104-1 configures the UE 102 to use an SDAP for the DRB, the UE 102 generates an SDAP PDU containing the data packet, and then includes the SDAP PDU in the PDCP PDU. The PDCP controller 122 may compute the long MAC-I using the same integrity protection algorithm that was indicated by the field of the Security Mode Command message, and possibly also the same key associated with the algorithm (e.g., the $K_{RRCInt}$ key), in some implementations and/or scenarios. If the security configuration and/or RRC Reconfiguration message indicated a different algorithm for integrity protection, however, the PDCP controller 122 may use that algorithm (e.g., with the $K_{RRCInt}$ key). The UE 102 then transmits 336 the PDCP PDU (or SDAP PDU) containing the data packet and the long MAC-I over the DRB, and the base station 104-1 verifies 340 the long MAC-I of the PDCP PDU (i.e., by computing a long XMAC-I and comparing to the received long MAC-I). If the base station 104-1 configures the UE 102 to use an SDAP for the DRB, the base station 104-1 extracts the data packet from the SDAP PDU. The base station 104-1 then transmits 342 the data packet from the PDCP PDU to the 5GC 110.

In the example scenario of FIGS. 3A and 3B, the 5GC 110 then transmits 344 another data packet (e.g., data relating to layers 154) for the DRB to the base station 104-1. The PDCP controller 162 of the base station 104-1 then generates a PDCP PDU (or, in some implementations, an SDAP PDU) containing a data packet and a long MAC-I. The data packet may be an IP packet, for example. If the base station 104-1 configures the UE 102 to use the SDAP for the DRB, the base station 104-1 generates an SDAP PDU containing the data packet, and then includes the SDAP PDU in the PDCP PDU. The PDCP controller 162 may compute the long MAC-I for the PDCP PDU using the same integrity protection algorithm that was indicated by the field of the Security Mode Command message, and possibly also the same key associated with the algorithm (e.g., the $K_{RRCInt}$ key), in some implementations and/or scenarios. If the security configuration and/or RRC Reconfiguration message indicated a different algorithm for integrity protection, however, the PDCP controller 162 may use that algorithm (e.g., with the $K_{RRCInt}$ key). The base station 104-1 then transmits 346 the PDCP PDU (or SDAP PDU) containing the data packet and the long MAC-I over the DRB, and the UE 102 verifies 348 the long MAC-I of the PDCP PDU (i.e., by computing a long XMAC-I and comparing to the received long MAC-I).

In a first implementation corresponding to the example message diagram of FIGS. 3A and 3B, before the transmission 326, the base station 104-1 configures a first DRB to the UE 102 (e.g., "DRB 1"), configures integrity protection for the first DRB and configures a second DRB to the UE 102 (e.g., "DRB 2"), but does not configure integrity protection for the second DRB. To do this, the base station 104-1 may (before transmission 326) transmit to the UE 102, within each of one or more PDCP PDUs, an additional RRC Reconfiguration message and respective short MAC-I. Thereafter, if the UE 102 successfully verifies the short MAC-I for the RRC Reconfiguration message sent in the transmission 326, the UE 102 does not use the long MAC-I format for the second DRB. That is, in this implementation and scenario, the UE 102 and the base station 104-1 include neither a short MAC-I nor a long MAC-I in PDCP PDUs exchanged over the second DRB.

In a second implementation corresponding to the example message diagram of FIGS. 3A and 3B, before the transmission 326, the base station 104-1 configures a first DRB to the UE 102 (e.g., "DRB 1"), configures integrity protection for the first DRB, configures a second DRB to the UE 102 (e.g., "DRB 2"), and configures integrity protection for the second DRB. To do this, the base station 104-1 may (before transmission 326) transmit to the UE 102, within each of one or more PDCP PDUs, an additional RRC Reconfiguration message and respective short MAC-I. In this implementation, the UE 102 uses the short MAC-I format for data packets to be transmitted or received over either of the two DRBs (e.g., to compute a short MAC-I or XMAC-I in the manner discussed above). Thereafter, if the UE 102 successfully verifies the short MAC-I for the RRC Reconfiguration message sent in the transmission 326, the UE 102 may use the long MAC-I format for data packets sent over the second DRB. That is, the security configuration is applied to not only the first DRB, but also the second DRB.

In a third implementation corresponding to the example message diagram of FIGS. 3A and 3B, before the transmission 326, the base station 104-1 configures a first DRB to the UE 102 (e.g., "DRB 1"), configures integrity protection for the first DRB, configures a second DRB to the UE 102 (e.g., "DRB 2"), and configures integrity protection for the second DRB. To do this, the base station 104-1 may (before transmission 326) transmit to the UE 102, within each of one or more PDCP PDUs, an additional RRC Reconfiguration message and respective short MAC-I. In this implementation, the UE 102 uses the short MAC-I format for data packets to be transmitted or received over either of the two DRBs (e.g., to compute a short MAC-I or XMAC-I in the manner discussed above). Thus, the third implementation may initially be identical or similar to the second implementation discussed above. However, if the UE 102 then successfully verifies the short MAC-I for the RRC Reconfiguration message sent in the transmission, the UE 102 does not use the long MAC-I format for data packets sent over the second DRB. That is, the security configuration is applied to the first DRB but not the second DRB.

In each of the first, second, and third implementations described above, the base station 104-1 may configure the UE 102 to use the long MAC-I format in the manner shown in FIGS. 3A and 3B. Thus, for each of the additional RRC Reconfiguration message(s) discussed above, the base station 104-1 may include a security configuration (indicating the long MAC-I format) in that additional RRC Reconfiguration message, and transmits that additional RRC Reconfiguration message to the UE 102 in a PDCP PDU (e.g., before transmission 326 occurs).

In some implementations, if the base station 104-1 fails to successfully verify the long MAC-I for a data packet received over the DRB, the base station 104-1 transmits an RRC Release message to the UE 102 to terminate the connection between the UE 102 and the base station 104-1. In an alternative implementation, if the base station 104-2 fails to successfully verify the long MAC-I for a data packet received over the DRB, the base station 104-1 ignores the data packet. In this alternative implementation, however, if the base station 104-1 fails to successfully verify the long MAC-I for multiple data packets received over the DRB (e.g., some threshold number of data packets predetermined by the base station 104-1), the base station 104-1 transmits an RRC Release message to the UE 102 terminate the connection between the UE 102 and the base station 104-1.

Depending on the implementation, the base station 104-1 may only transmit the RRC Release message if the base station 104-1 receives the multiple data packets consecutively, or may transmit the RRC Release message regardless of whether the base station 104-1 receives the multiple data packets consecutively.

Figure 4A:
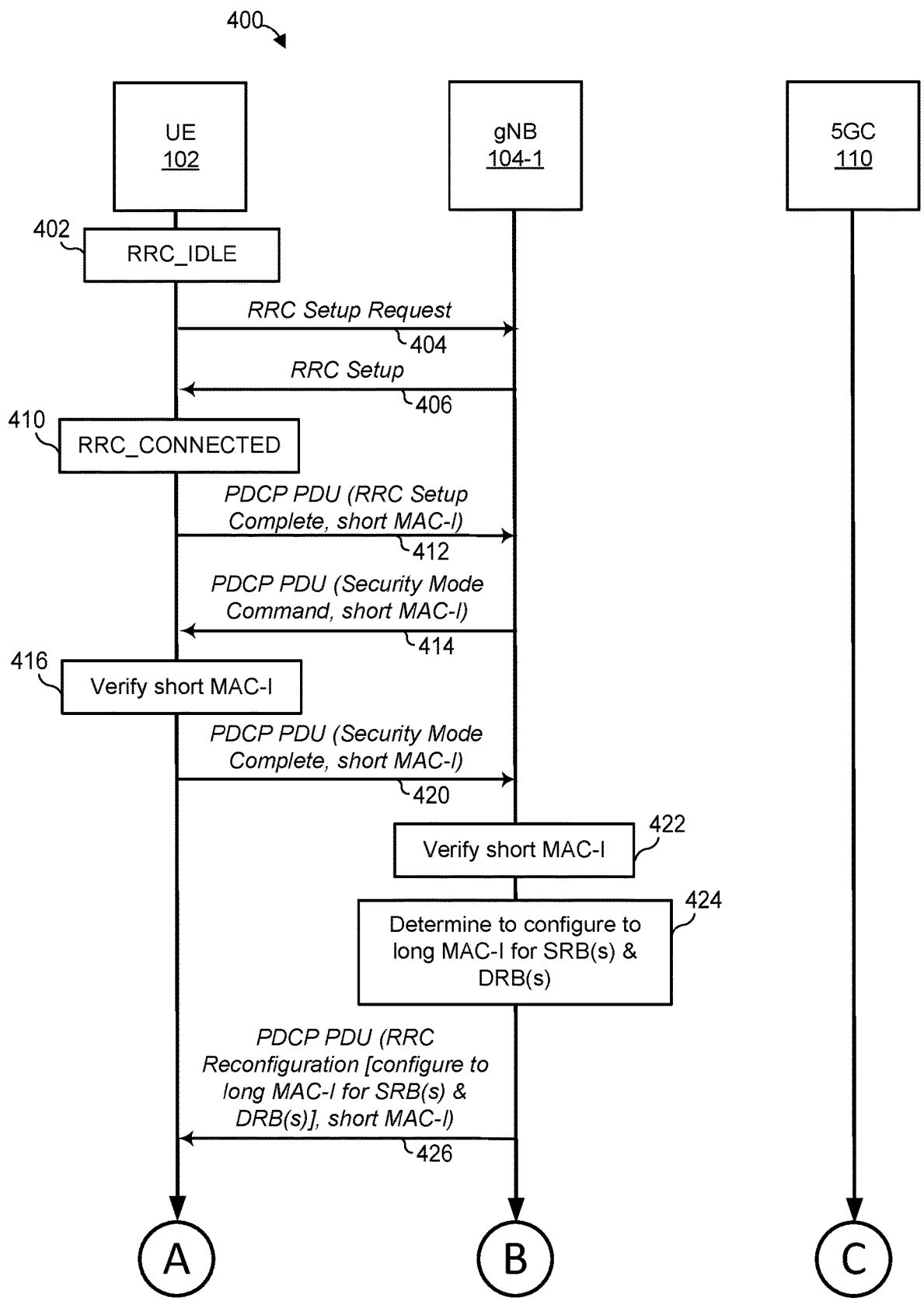
Figure 4B:
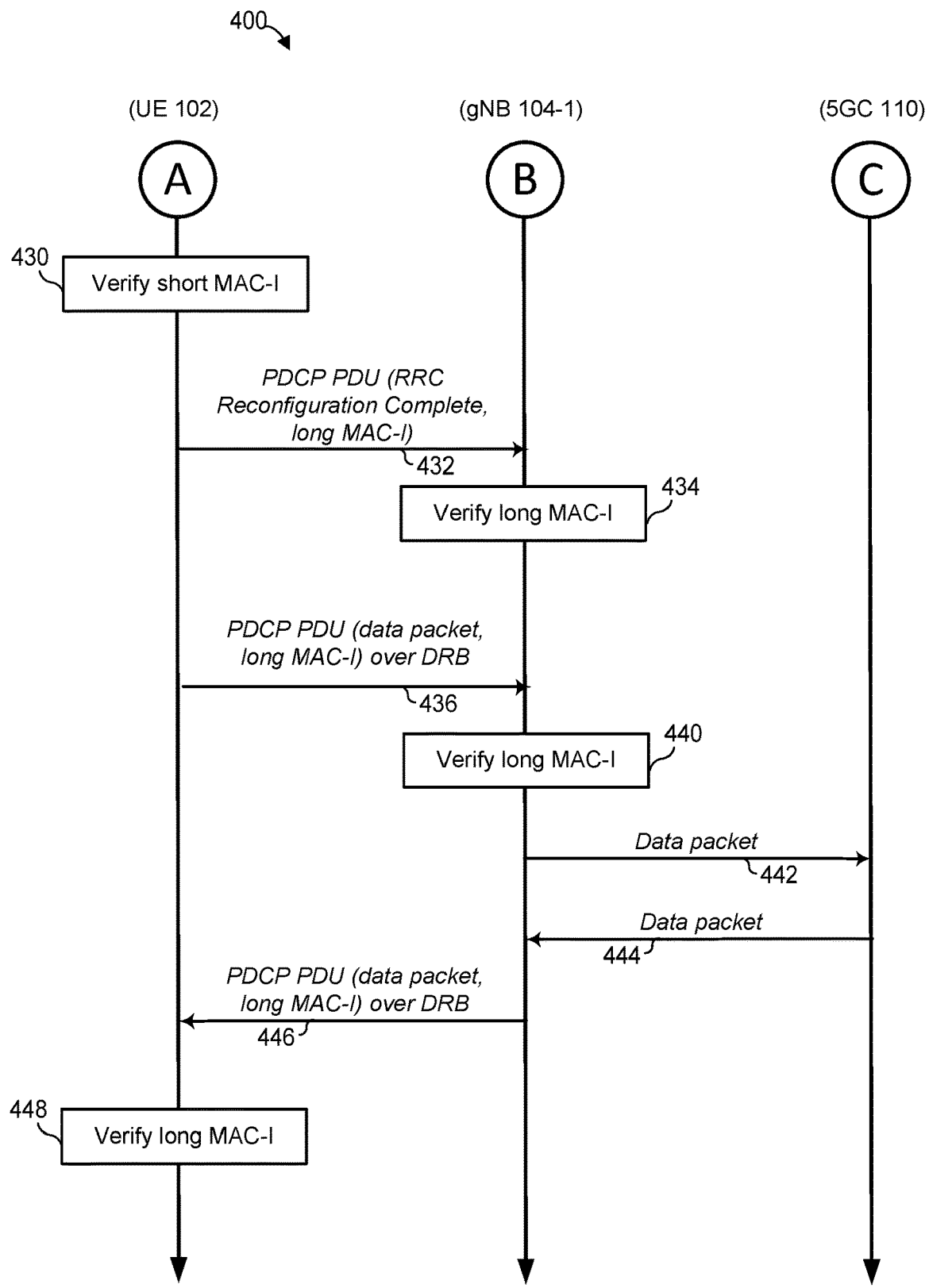

Moreover, in some implementations, the base station 104-1 may configure the UE 102 to use the long MAC-I format for the SRB(s) and DRB(s) simultaneously, as shown in the example implementation and scenario of FIGS. 4A and 4B. In FIGS. 4A and 4B, a messaging diagram 400 depicts example messages that may be exchanged between the UE 102, base station 104-1 and 5GC 110 of FIG. 1, according to another implementation and/or scenario. The actions and messages shown in FIGS. 4A and 4B may be similar or identical to the corresponding actions and messages shown in FIGS. 3A and 3B (e.g., with 302 of FIG. 3A corresponding to 402 of FIG. 4A, and 304 of FIG. 3A corresponding to 404 of FIG. 4A, etc.), with the exception that: (1) the base station 104-1 determines 424 to configure to use the long MAC-I format for both the SRB(s) and DRB(s) in the messaging diagram 400 (rather than just DRB); (2) the RRC Reconfiguration message transmitted 426 in the messaging diagram 400 includes a security configuration indicating the long MAC-I format for both the SRB(s) and DRB(s) (rather than just DRB); (3) the PDCP PDU containing the RRC Reconfiguration Complete message (in transmission 432) includes a long MAC-I (rather than a short MAC-I); and (4) the base station verifies 434 a long MAC-I (rather than a short MAC-I) in the PDCP PDU containing the RRC Reconfiguration Complete message.

As noted above, the base station 104-1 may, in some implementations, need to learn the MAC-I length capabilities of the UE 102 before attempting to configure the UE 102 to use the long MAC-I format. For example, the UE 102 may transmit the UE capability information indicating that the UE 102 supports the long MAC-I format to the base station 104-1, or to the 5GC 110. The base station 104-1 may forward the UE capability information from the UE 102 to the core network, for example. In some implementations and/or scenarios, the base station 104-1 receives UE capability information indicating support of the long MAC-I format from the UE 102 or the 5GC 110 (e.g., from an Access and Mobility Management Function (AMF)), before transmitting 426 an RRC Reconfiguration message configuring the long MAC-I format to the UE 102 (e.g., as described previously).

UE capability information transmitted by the UE 102 may have the same format as UE capability information received by the base station 104-1, for example, or may have a different format. The base station 104-1 may determine to configure the long MAC-I format in response to determining that the UE capability information indicates the UE 102 supports the long MAC-I. If the UE 102 instead were to indicate no support of the long MAC-I (or the base station simply does not receive an indication of support by the UE 102 for the long MAC-I), the base station 104-1 may not determine to configure the long MAC-I format to the UE 102, or may explicitly determine not to configure the long MAC-I to the UE 102. In other implementations and/or scenarios, the 5GC 110 may send a network interface message to configure the base station 104-1 to use the long MAC-I format for the UE 102, in response to the 5GC 110 determining that the UE capability information indicates the UE 102 supports the long MAC-I.

Figure 5:
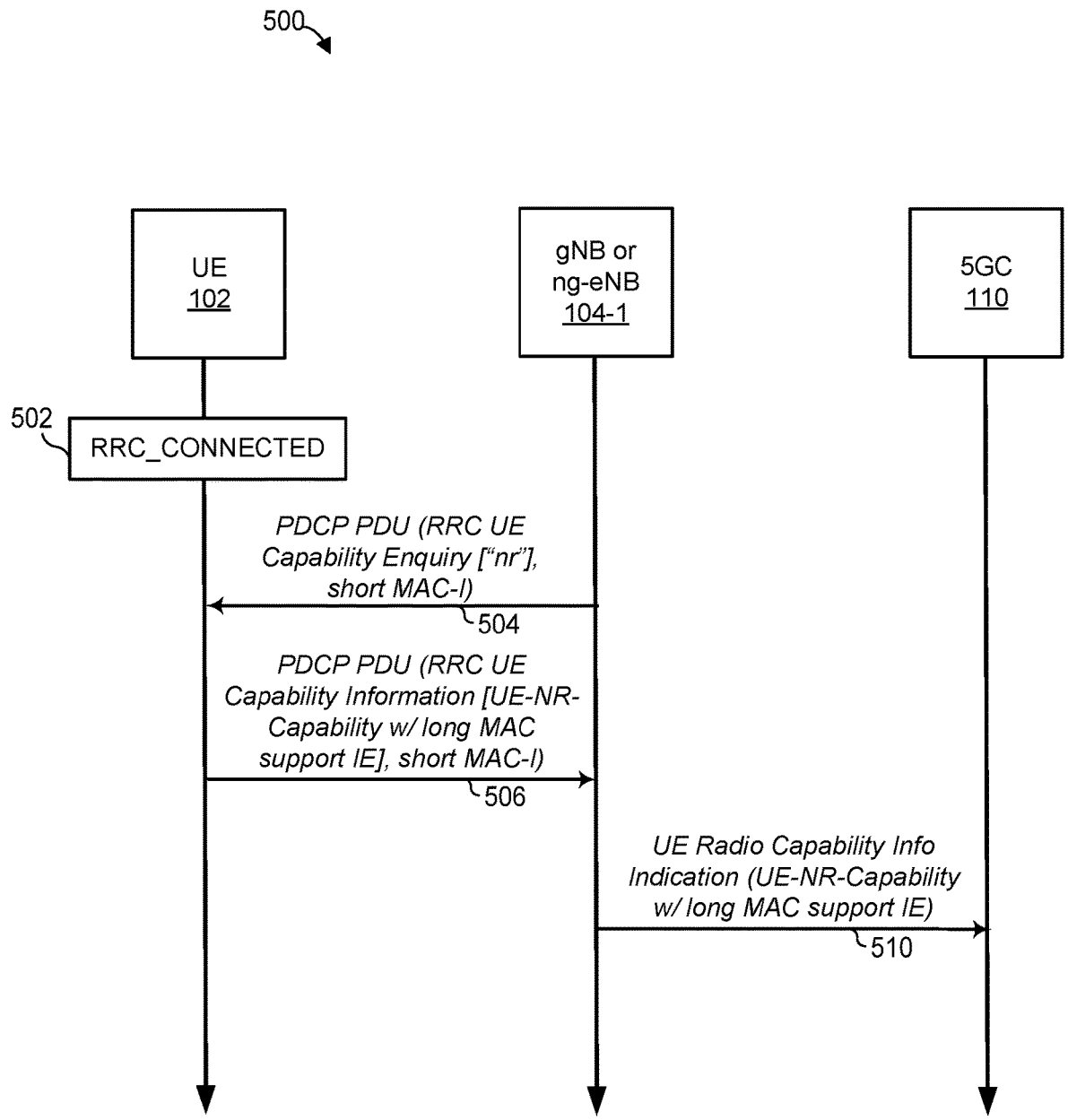

FIG. 5 depicts a messaging diagram 500 corresponding to one implementation and scenario in which the base station 104-1, which may be a gNB or an ng-eNB, learns the capabilities of the UE 102. In the messaging diagram 500, the UE 102 enters 502 an RRC_CONNECTED state. The PDCP controller 162 of base station 104-1 generates a PDCP PDU containing a UE Capability Enquiry message to query the 5G NR capability of the UE 102, and also containing a short MAC-I. The base station 104-1 transmits 504 the PDCP PDU containing the UE Capability Enquiry message and the short MAC-I to the UE 102.

In response, if the UE 102 successfully verifies the short MAC-I in the PDCP PDU containing the UE Capability Enquiry message, the UE 102 transmits 506 to the base station 104-1 a UE Capability Information message contained in a PDCP PDU that also contains a short MAC-I computed by PDCP controller 122. The UE Capability Information message includes a UE-NR-Capability information element. In the depicted scenario, the UE-NR-Capability information element indicates that the UE 102 supports the long MAC-I format.

After successfully verifying the short MAC-I appended to the UE Capability Information message, and identifying the UE-NR-Capability information element in that message, the base station 104-1 includes the UE-NR-Capability information element in a network interface message (e.g., a Next Generation Application Protocol (NGAP) message or a UE RADIO CAPABILITY INFO INDICATION message), and transmits 510 the message to the 5GC 110. In other implementations, the base station 104-1 receives from the 5GC 110 a network interface message (e.g., an NGAP message or an INITIAL CONTEXT SETUP REQUEST message) indicating UE support of the long MAC-I format, or configuring communications between the UE 102 and base station 104-1 to the long MAC-I.

In an alternative implementation and/or scenario, the UE 102 includes UE capability information indicating support of the long MAC-I format in a Registration Request message, and transmits the Registration Request message to the 5GC 110 via a base station (i.e., via the base station 104-1 or another base station such as base station 104-2) when the UE 102 registers to the 5GC 110, at a time before transmitting the RRC Setup Request message as described elsewhere in this disclosure (e.g., with respect to transmission 204, 304 or 404), at a time before receiving the RRC Reconfiguration message configuring the long MAC-I format to the UE 102 as described elsewhere in this disclosure (e.g., with respect to transmission 226, 326 or 426), or along with the RRC Setup Complete message as described elsewhere in this disclosure (e.g., by including the Registration Request message in transmission 212, 312 or 412). Thereafter, the 5GC 110 transmits the network interface message, including an information element (e.g., a UE Security Capabilities information element) indicating support of the long MAC-I format for the UE 102, to the base station 104-1 when the UE 102 connects to the 5GC 110 via the base station 104-1.

In another implementation and/or scenario, the 5GC 110 receives from a base station (i.e., the base station 104-1 or another base station such as base station 104-2) a UE-NR-Capability information element that includes UE capability information indicating support of the long MAC-I format. The transmitting base station may include the UE-NR-Capability information element in a UE RADIO CAPABILITY INFO INDICATION message, for example.

Figure 6:
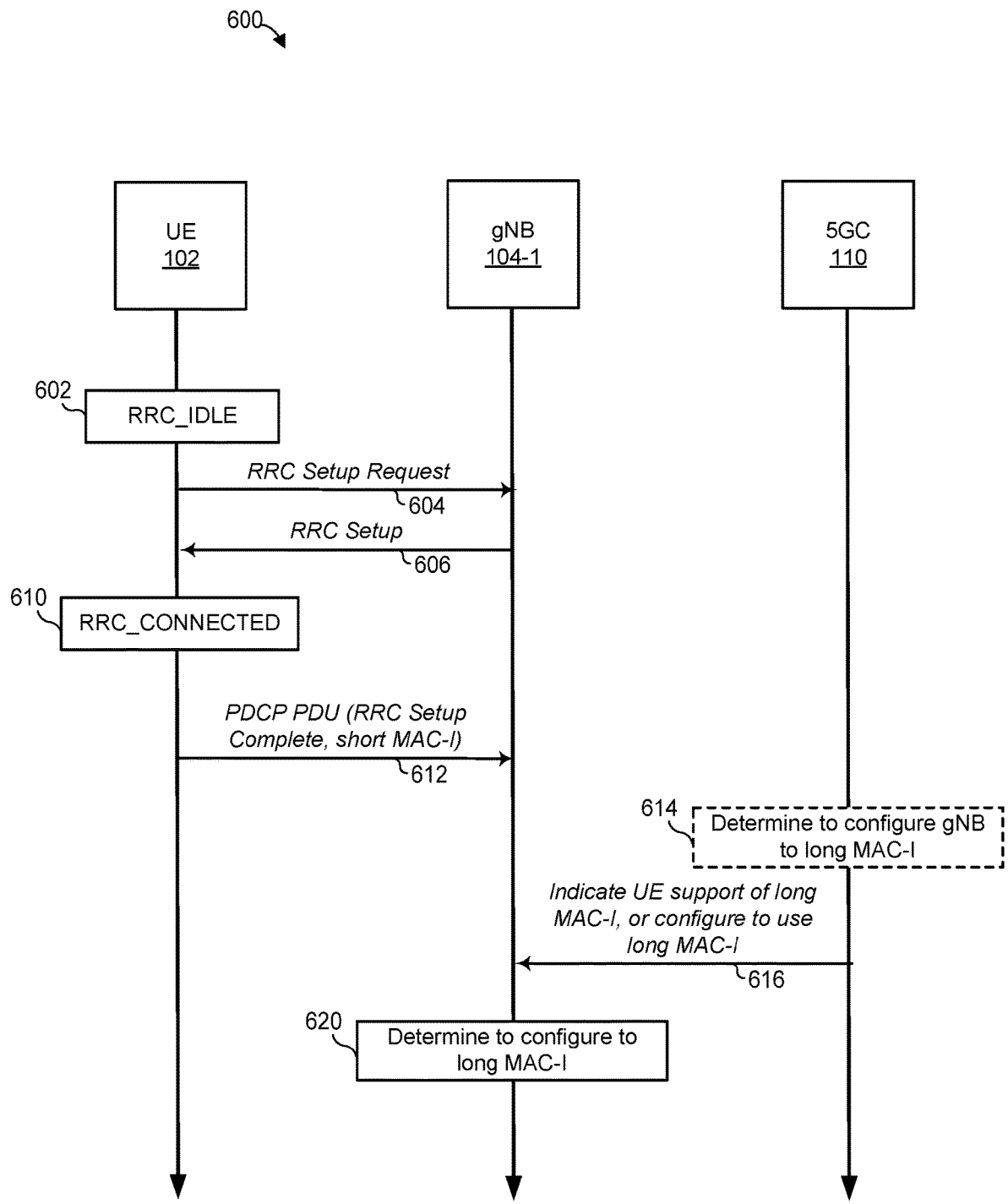

FIG. 6 depicts a messaging diagram 600 that reflects one example implementation and scenario in which the 5GC 110 has already learned the UE capability information in such a manner. As seen in FIG. 6, after the UE 102 enters 602 the RRC_IDLE stage, the UE 102 transmits 604 the RRC Setup Request message to the base station 104-1, the base station 104-1 transmits 606 the RRC Setup message to the UE 102, the UE 102 enters 610 the RRC_CONNECTED state, and the UE 102 transmits 612 a PDCP PDU containing the RRC Setup Complete message and a short MAC-I to the base station 104-1, as described above for other implementations.

In one implementation the 5GC 110, which has already learned the UE capability information as described above, determines 614 to configure the base station 104-1 to use a long MAC-I format (with respect to communications with the UE 102). The 5GC 110 then transmits 616 a message (e.g., an NGAP message such as an INITIAL CONTEXT SETUP REQUEST message) to the base station 104-1 when the UE 102 connects to the 5GC 110 via the base station 104-1. The message indicates/instructs (e.g., in a long MAC-I configuration information element) that the base station 104-1 is to configure to use the long MAC-I format for communications with the UE 102. By analyzing/processing this message, the base station 104-1 determines 620 to configure to use the long MAC-I format, and (not shown in FIG. 6) may transmit a network interface message to configure the base station 104-1 to use to long MAC-I format.

In an alternative implementation and/or scenario, the 5GC 110 does not determine 614 to configure the base station 104-1 to a long MAC-I format with respect to communications with the UE 102. Instead, the 5GC 110 merely transmits 616 an indication (e.g., in a capability information element such as a UE-NR-Capability information element or a UE Security Capabilities information element in an NGAP message) that the UE 102 supports the long MAC-I format, and the base station 104-1 determines 620 to configure to use the long MAC-I format based on that indication.

FIGS. 7-9 show various implementations and/or scenarios for configuring the UE 102 to use the long MAC-I format when the 5GC 110 either (1) configures the base station 104-1 to use the long MAC-I format for communications with the UE 102, or (2) indicates UE support for the long MAC-I format so that the base station 104-1 itself can decide to use the long MAC-I format for communications with the UE 102.

Figure 7A:
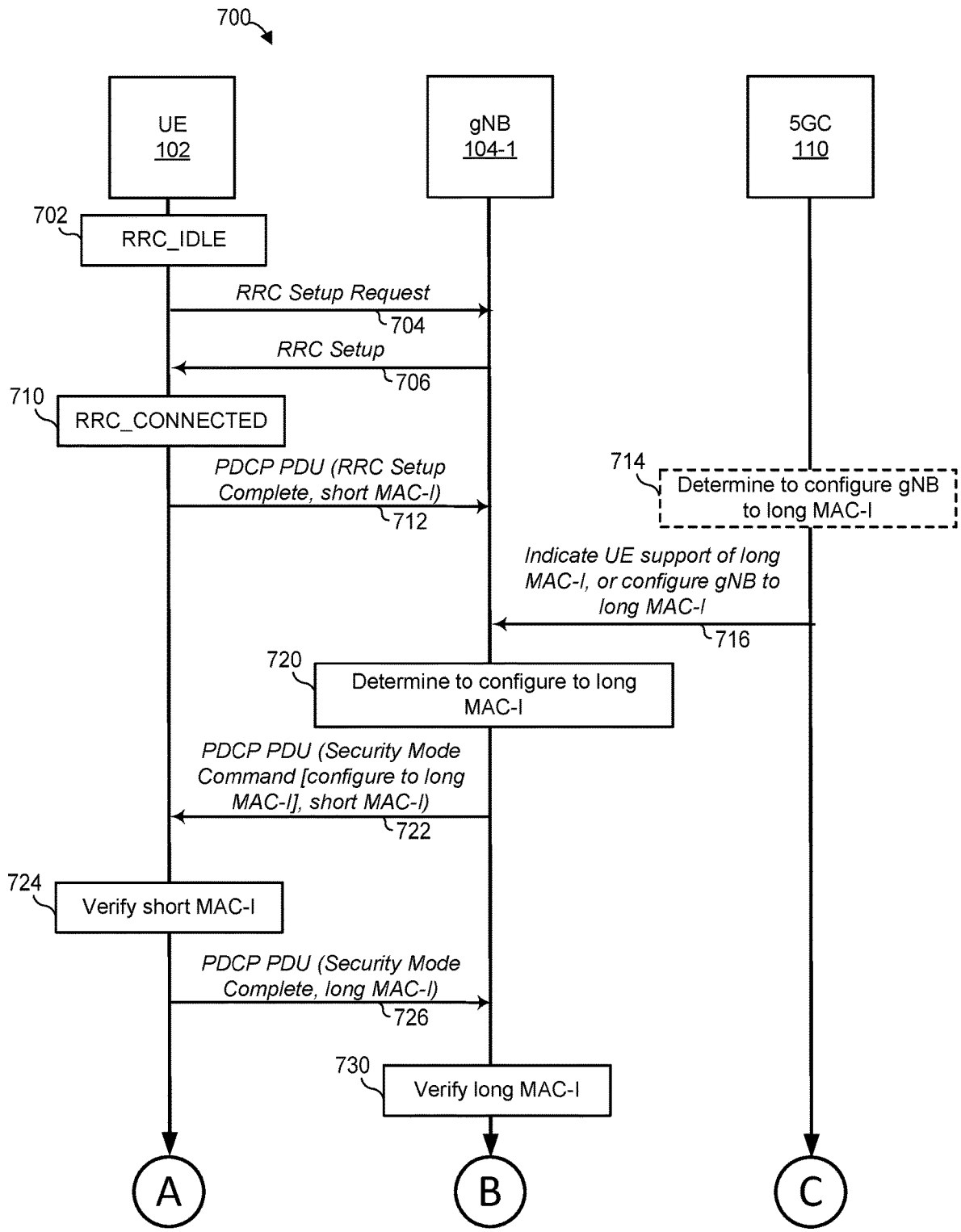
Figure 7B:
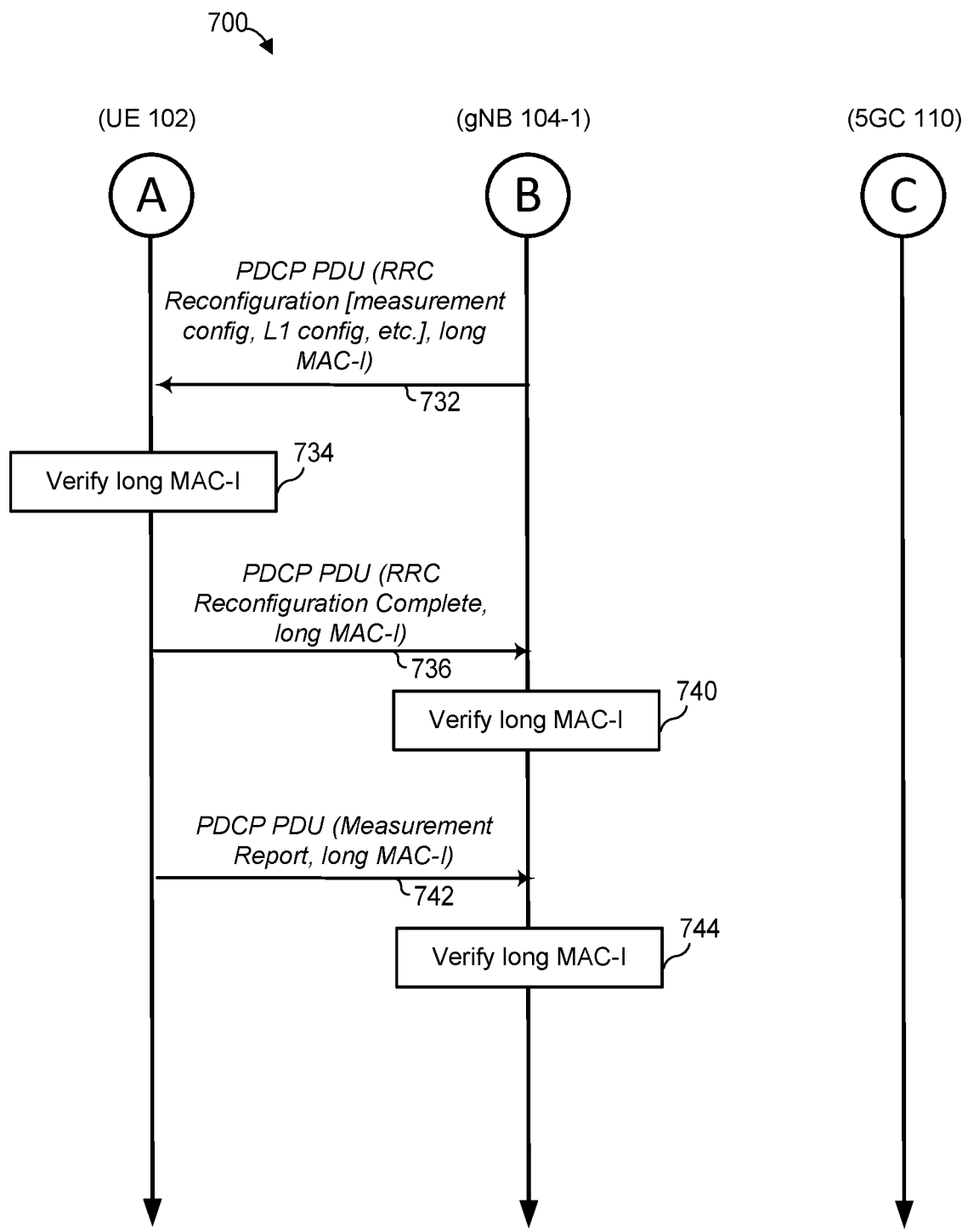

Referring first to FIGS. 7A and 7B, after the UE 102 enters 702 the RRC_IDLE stage, the UE 102 transmits 704 the RRC Setup Request message to the base station 104-1, the base station 104-1 transmits 706 the RRC Setup message to the UE 102, the UE 102 enters 710 the RRC_CONNECTED state, and the UE 102 transmits 712 a PDCP PDU containing the RRC Setup Complete message and a short MAC-I to the base station 104-1, as described above for other implementations (e.g., with respect to FIGS. 2A and 2B).

In one implementation and/or scenario, at some point before, during, or after the transmission 712, the 5GC 110 determines 714 to configure the base station 104-1 to use the long MAC-I format (for purposes of communications with the UE 102). The 5GC 110 may have learned that the UE 102 supports the long MAC-I format in any of the ways discussed above (e.g., as discussed above in connection with FIG. 5 or 6), for example. The 5GC 110 then transmits 716 a message (e.g., an NGAP message such as an INITIAL CONTEXT SETUP REQUEST message) to the base station 104-1 when the UE 102 connects to the 5GC 110 via the base station 104-1. The message indicates/instructs (e.g., in a long MAC-I configuration information element) that the base station 104-1 is to configure to use the long MAC-I format for communications with the UE 102. By analyzing/ processing this message, the base station 104-1 determines 720 to configure to use the long MAC-I format.

In an alternative implementation and/or scenario, the 5GC 110 does not determine 714 to configure the base station 104-1 to use a long MAC-I format with respect to communications with the UE 102. Instead, after receiving an indication (e.g., in a capability information element such as a UE-NR-Capability information element or a UE Security Capabilities information element) that the UE 102 supports the long MAC-I format (e.g., from base station 104-2), the 5GC 110 merely transmits 716 an indication that the UE 102 supports the long MAC-I format, and the base station 104-1 determines 720 to configure to use the long MAC-I format based on that indication.

In other scenarios, where the 5GC 110 does not transmit 716 either the indication of UE support for the long MAC-I format or an instruction to configure to use the long MAC-I format, the base station 104-1 does not configure to use the long MAC-I format, and does not configure the UE 102 to use the long MAC-I format. Alternatively, in such a scenario, the base station 104-1 may transmit a UE Capability Enquiry message to the UE 102, and receive in response a UE Capability Information message from the UE 102, e.g., as discussed above in connection with FIG. 5.

Returning to the scenario of FIGS. 7A and 7B, after the base station 104-1 determines 720 to configure use to the long MAC-I format, the PDCP controller 162 of base station 104-1 generates a PDCP PDU containing a Security Mode Command message and a short MAC-I. The Security Mode Command message includes an indication that the UE 102 is to configure to use the long MAC-I format for communications with the base station 104-1. The PDCP controller 162 may compute the short MAC-I using any algorithm and key discussed above (e.g., the integrityProtAlgorithm and $K_{RRCInt}$ key), for example. The base station 104-1 transmits 722 the PDCP PDU containing the Security Mode Command message and the short MAC-I to the UE 102, and the UE 102 verifies 724 the short MAC-I using the same algorithm and key.

After successful verification of the short MAC-I, the PDCP controller 122 of UE 102 generates a PDCP PDU containing a Security Mode Complete message and a long MAC-I. The PDCP controller 122 may compute the long MAC-I using any algorithm and key discussed above (e.g., the integrityProtAlgorithm and $K_{RRCInt}$ key), for example. The UE 102 transmits 726 the PDCP PDU containing the Security Mode Complete message and the long MAC-I to the base station 104-1, and the base station 104-1 verifies 730 the long MAC-I using the same algorithm and key.

Later, in the example scenario of FIGS. 7A and 7B, the PDCP PDU controller 162 of base station 104-1 generates a PDCP PDU containing an RRC Reconfiguration message and a long MAC-I, and the base station 104-1 transmits 732 the PDCP PDU to the UE 102. The RRC Reconfiguration message may include the same fields as the RRC Reconfiguration message of transmission 236 in messaging diagram 200 of FIG. 2, for example. After the UE 102 verifies 734 the long MAC-I for the RRC Reconfiguration message, the PDCP controller 122 of UE 102 may generate a PDCP PDU containing an RRC Reconfiguration Complete message and a long MAC-I, and the UE 102 may transmit 736 the PDCP PDU to the base station 104-1. At some time after the base station 104-1 verifies 740 the long MAC-I for the RRC Reconfiguration Complete message, the PDCP controller 122 of UE 102 may generate a PDCP PDU containing a Measurement Report message and a long MAC-I, and the UE 102 may transmit 742 the PDCP PDU to the base station 104-1. The base station 104-1 then verifies 744 the long MAC-I for the Measurement Report message.

Figure 8A:
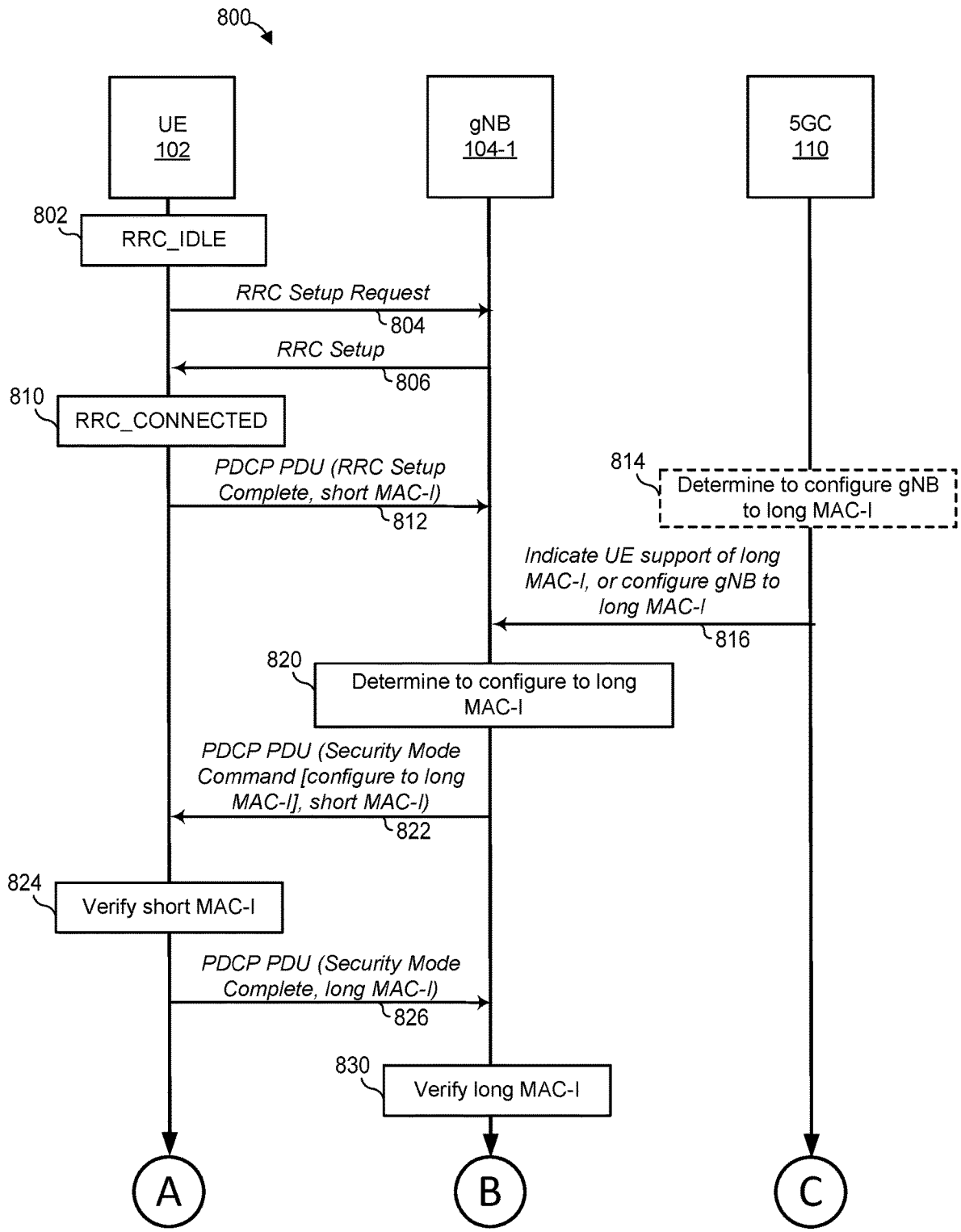
Figure 8B:
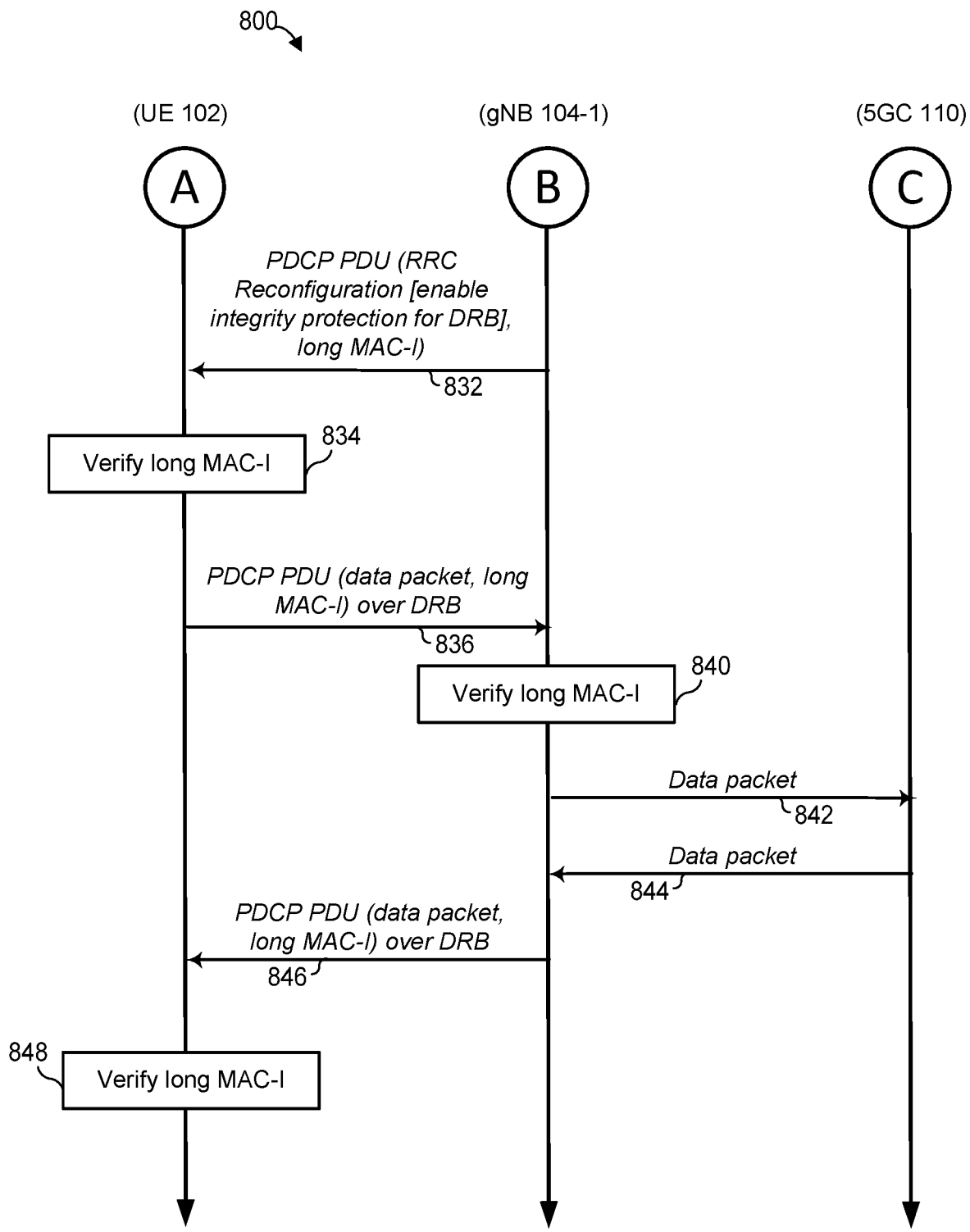

FIGS. 8A and 8B depict a messaging diagram 800 reflecting an implementation and scenario in which the base station 104-1 configures the UE 102 to use the long MAC-I format for one or more SRBs and one or more DRBs in a Security Mode Command message. In the messaging diagram 800, after the UE 102 enters 802 the RRC_IDLE stage, the UE 102 transmits 804 the RRC Setup Request message to the base station 104-1, the base station 104-1 transmits 806 the RRC Setup message to the UE 102, the UE 102 enters 810 the RRC_CONNECTED state, and the UE 102 transmits 812 a PDCP PDU containing the RRC Setup Complete message and a short MAC-I to the base station 104-1, as described above for other implementations (e.g., with respect to FIGS. 4A and 4B).

In one implementation and/or scenario, at some point before, during or after the transmission 812, the 5GC 110 determines 814 to configure the base station 104-1 to the long MAC-I format (for purposes of communications with the UE 102). The 5GC 110 may have learned that the UE 102 supports the long MAC-I format in any of the ways discussed above (e.g., as discussed above in connection with FIG. 5 or 6), for example. The 5GC 110 then transmits 816 a message (e.g., an NGAP message such as an INITIAL CONTEXT SETUP REQUEST message) to the base station 104-1 when the UE 102 connects to the 5GC 110 via the base station 104-1. The message indicates/instructs (e.g., in a long MAC-I configuration information element) that the base station 104-1 is to configure to use the long MAC-I format for communications with the UE 102. By analyzing/processing this message, the base station 104-1 determines 820 to configure to use the long MAC-I format.

In an alternative implementation and/or scenario, the 5GC 110 does not determine 814 to configure the base station 104-1 to use a long MAC-I format with respect to communications with the UE 102. Instead, after receiving an indication (e.g., in a capability information element such as a UE-NR-Capability information element or a UE Security Capabilities information element in an NGAP message) that the UE 102 supports the long MAC-I format (e.g., from base station 104-2), the 5GC 110 merely transmits 816 an indication that the UE 102 supports the long MAC-I format to the base station 104-1, and the base station 104-1 determines 820 to configure to use the long MAC-I format based on that indication.

In other scenarios, where the 5GC 110 does not transmit 816 either the indication of UE support for the long MAC-I format or an instruction to configure to use the long MAC-I format, the base station 104-1 does not configure to use the long MAC-I format, and does not configure the UE 102 to use the long MAC-I format. Alternatively, in such a scenario, the base station 104-1 may transmit a UE Capability Enquiry message to the UE 102, and receive in response a UE Capability Information message from the UE 102, e.g., as discussed above in connection with FIG. 5.

Returning the scenario of FIGS. 8A and 8B, after the base station 104-1 determines 820 to configure to use the long MAC-I format, the PDCP controller 162 of base station 104-1 generates a PDCP PDU containing a Security Mode Command message and a short MAC-I. The Security Mode Command message includes an indication that the UE 102 is to configure to use the long MAC-I format for communications with the base station 104-1. The PDCP controller 162 may compute the short MAC-I using any algorithm and key discussed above (e.g., the integrityProtAlgorithm and $K_{RRCInt}$ key), for example. The base station 104-1 transmits 822 the PDCP PDU containing the Security Mode Command message and the short MAC-I to the UE 102, and the UE 102 verifies 824 the short MAC-I using the same algorithm and key.

After successful verification of the short MAC-I, the PDCP controller 122 of UE 102 generates a PDCP PDU containing a Security Mode Complete message and a long MAC-I. The PDCP controller 122 may compute the long MAC-I using any algorithm and key discussed above (e.g., the integrityProtAlgorithm and $K_{RRCint}$ key), for example. The UE 102 transmits 826 the PDCP PDU containing the Security Mode Complete message and the long MAC-I to the base station 104-1, and the base station 104-1 verifies 830 the long MAC-I using the same algorithm and key.

Later, in the example scenario of FIGS. 8A and 8B, the PDCP PDU controller 162 of base station 104-1 generates a PDCP PDU containing an RRC Reconfiguration message and a long MAC-I. The RRC Reconfiguration message include an information element indicating that the UE 102 is to enable integrity protection for a DRB (or, in some implementations, more than one DRB). The base station 104-1 transmits 832 the PDCP PDU to the UE 102. After the UE 102 verifies 834 the long MAC-I, the UE 102 enables integrity protection for the DRB(s), and the PDCP controller 122 of UE 102 may generate a PDCP PDU containing a data packet and a long MAC-I. The UE 102 transmits 836 the PDCP PDU to the base station 104-1 over a DRB, and the base station 104-1 verifies 840 the long MAC-I for the data packet. The base station 104-1 may then transmit 842 the data packet to the 5GC 110.

In the example scenario of FIGS. 8A and 8B, the 5GC 110 then transmits 844 another data packet (e.g., data relating to layers 154) for the DRB to the base station 104-1. The PDCP controller 162 of the base station 104-1 then generates a PDCP PDU containing a data packet and a long MAC-I. The data packet may be an IP packet, for example. The PDCP controller 162 may compute the long MAC-I for the PDCP PDU using the same integrity protection algorithm that was indicated by the field of the Security Mode Command message, and possibly also the same key associated with the algorithm (e.g., the $K_{RRCInt}$ key), in some implementations and/or scenarios. If the security configuration and/or RRC Reconfiguration message indicated a different algorithm for integrity protection, however, the PDCP controller 162 may use that algorithm (e.g., with the $K_{RRCInt}$ key). The base station 104-1 then transmits 846 the PDCP PDU containing the data packet and the long MAC-I over the DRB, and the UE 102 verifies 848 the long MAC-I of the PDCP PDU (i.e., by computing a long XMAC-I and comparing to the received long MAC-I). In some embodiments and/or scenarios, the UE 102 and base station 104-1 may instead generate SDAP PDUs for the DRB (e.g., as discussed above in connection with FIGS. 3A and 3B).

Figure 9A:
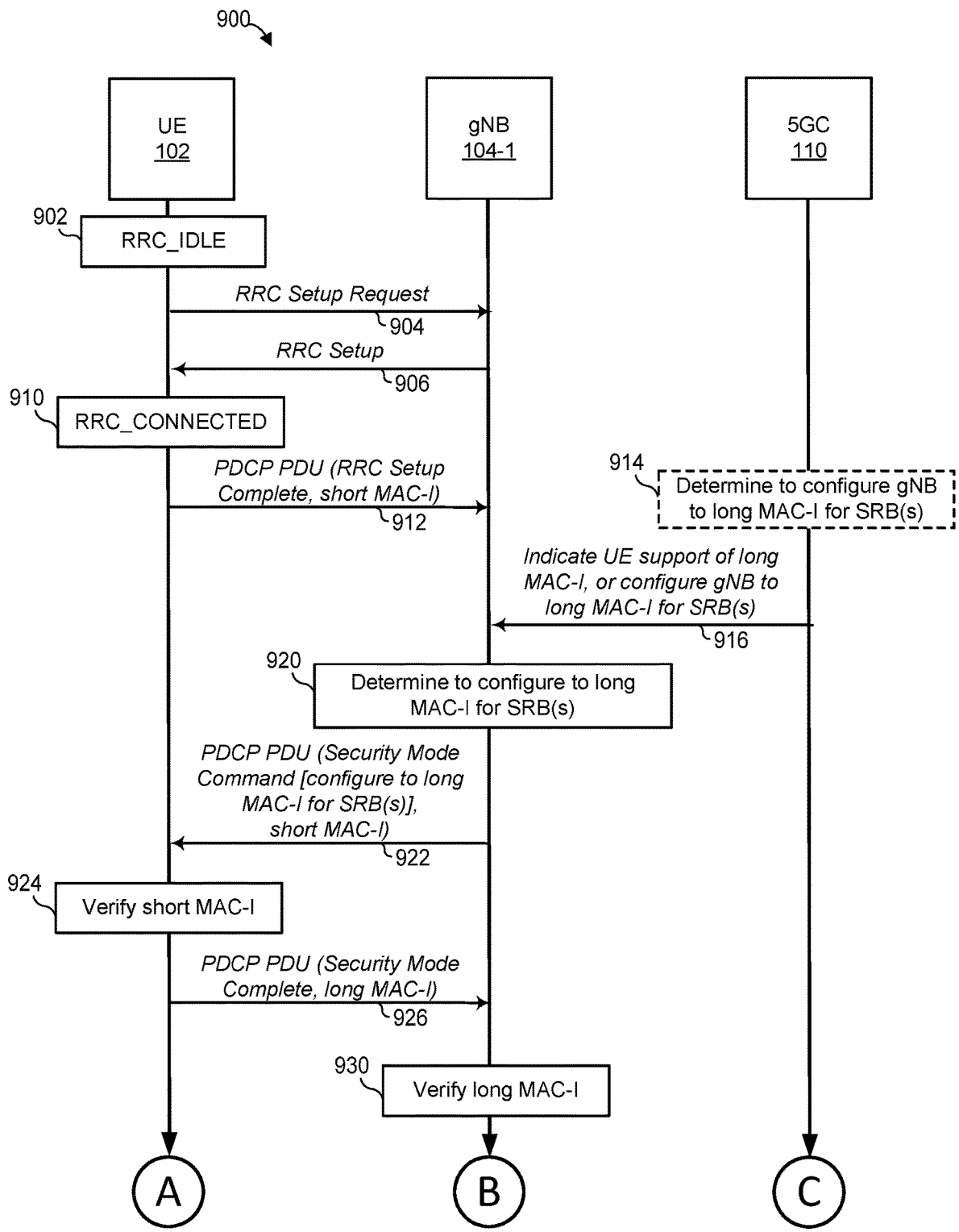
Figure 9B:
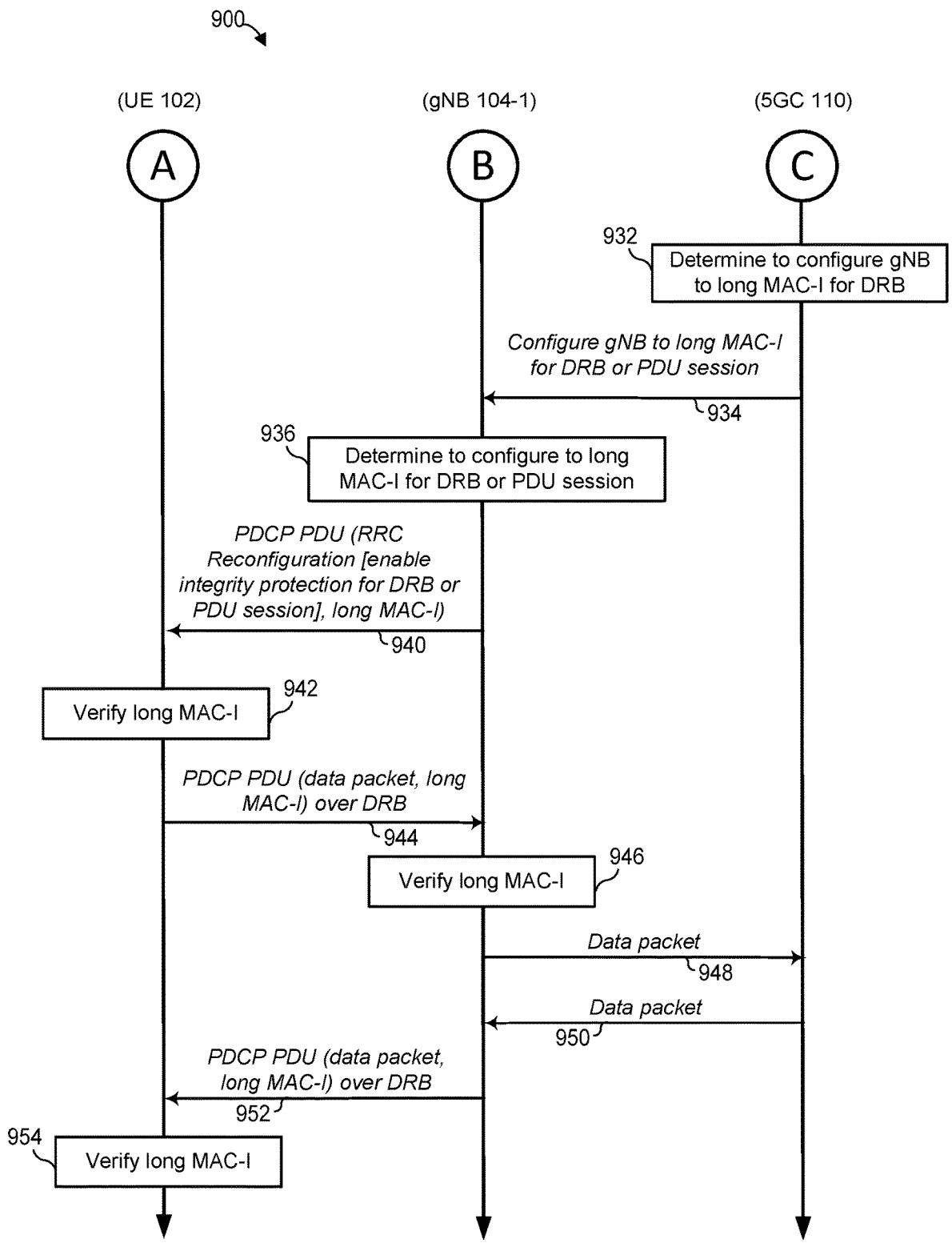

FIGS. 9A and 9B depict a messaging diagram 900 reflecting an implementation and scenario in which the base station 104-1 configures the UE 102 to use the long MAC-I format for one or more SRBs in a Security Mode Command message. In the messaging diagram 900, after the UE 102 enters 902 the RRC_IDLE stage, the UE 102 transmits 904 the RRC Setup Request message to the base station 104-1, the base station 104-1 transmits 906 the RRC Setup message to the UE 102, the UE 102 enters 910 the RRC_CONNECTED state, and the UE 102 transmits 912 a PDCP PDU containing the RRC Setup Complete message and a short MAC-I to the base station 104-1, as described above for other implementations (e.g., with respect to FIGS. 4A and 4B).

In one implementation and/or scenario, at some point before, during or after the transmission 912, the 5GC 110 determines 914 to configure the base station 104-1 to the long MAC-I format (for purposes of communications with the UE 102). The 5GC 110 may have learned that the UE 102 supports the long MAC-I format in any of the ways discussed above (e.g., as discussed above in connection with FIG. 5 or 6), for example. The 5GC 110 then transmits 916 a message (e.g., an NGAP message such as an INITIAL CONTEXT SETUP REQUEST message) to the base station 104-1 when the UE 102 connects to the 5GC 110 via the base station 104-1. The message indicates/instructs (e.g., in a long MAC-I configuration information element) that the base station 104-1 is to configure to use the long MAC-I format for communications with the UE 102 over one or more SRBs. By analyzing/processing this message, the base station 104-1 determines 920 to configure to use the long MAC-I format for the SRB(s).

In an alternative implementation and/or scenario, the 5GC 110 does not determine 914 to configure the base station 104-1 to use a long MAC-I format with respect to communications over the SRB(s) with the UE 102. Instead, after receiving an indication that the UE 102 supports the long MAC-I format (e.g., from base station 104-2), the 5GC 110 merely transmits 916 an indication (e.g., in a capability information element such as a UE-NR-Capability information element or a UE Security Capabilities information element in an NGAP message) that the UE 102 supports the long MAC-I format to the base station 104-1, and the base station 104-1 determines 920 to configure to use the long MAC-I format for the SRB(s) based on that indication.

In other scenarios, where the 5GC 110 does not transmit 916 either the indication of UE support for the long MAC-I format or an instruction to configure to use the long MAC-I format, the base station 104-1 does not configure to use the long MAC-I format for the SRB(s), and does not configure the UE 102 to use the long MAC-I format for the SRB(s). Alternatively, in such a scenario, the base station 104-1 may transmit a UE Capability Enquiry message to the UE 102, and receive in response a UE Capability Information message from the UE 102, e.g., as discussed above in connection with FIG. 5.

Returning the scenario of FIGS. 9A and 9B, after the base station 104-1 determines 920 to configure to use the long MAC-I format for the SRB(s), the PDCP controller 162 of base station 104-1 generates a PDCP PDU containing a Security Mode Command message and a short MAC-I. The Security Mode Command message includes an indication that the UE 102 is to configure to use the long MAC-I format for communications with the base station 104-1 over the SRB(s). The PDCP controller 162 may compute the short MAC-I using any algorithm and key discussed above (e.g., the integrityProtAlgorithm and $K_{RRCint}$ key), for example. The base station 104-1 transmits 922 the PDCP PDU containing the Security Mode Command message and the short MAC-I to the UE 102, and the UE 102 verifies 924 the short MAC-I using the same algorithm and key.

After successful verification of the short MAC-I, the PDCP controller 122 of UE 102 generates a PDCP PDU containing a Security Mode Complete message and a long MAC-I. The PDCP controller 122 may compute the long MAC-I using any algorithm and key discussed above (e.g., the integrityProtAlgorithm and $K_{RRCint}$ key), for example. The UE 102 transmits 926 the PDCP PDU containing the Security Mode Complete message and the long MAC-I to the base station 104-1, and the base station 104-1 verifies 930 the long MAC-I using the same algorithm and key.

At some time before, during, or after the verification 930, the 5GC 110 determines 932 to configure the base station 104-1 to the long MAC-I for a DRB, or for a PDU session (and thus, the DRB associated with the PDU session). The 5GC 110 then transmits 934 a message to the base station 104-1, instructing the base station 104-1 to configure to use the long MAC-I format for the DRB or PDU session. In response, the base station 104-1 determines 936 to configure to use the long MAC-I for the DRB or PDU session. The PDCP PDU controller 162 of base station 104-1 then generates a PDCP PDU containing an RRC Reconfiguration message and a long MAC-I. The RRC Reconfiguration message include an information element indicating that the UE 102 is to enable integrity protection for the DRB or the PDU session. The base station 104-1 transmits 940 the PDCP PDU to the UE 102.

In the example scenario of FIGS. 9A and 9B, the 5GC 110 then transmits 950 another data packet (e.g., data relating to layers 154) for the DRB to the base station 104-1. The PDCP controller 162 of the base station 104-1 then generates a PDCP PDU containing a data packet and a long MAC-I. The data packet may be an IP packet, for example. The PDCP controller 162 may compute the long MAC-I for the PDCP PDU using the same integrity protection algorithm that was indicated by the field of the Security Mode Command message, and possibly also the same key associated with the algorithm (e.g., the $K_{RRCInt}$ key), in some implementations and/or scenarios. If the security configuration and/or RRC Reconfiguration message indicated a different algorithm for integrity protection, however, the PDCP controller 162 may use that algorithm (e.g., with the $K_{RRCInt}$ key). The base station 104-1 then transmits 952 the PDCP PDU containing the data packet and the long MAC-I over the DRB, and the UE 102 verifies 954 the long MAC-I of the PDCP PDU (i.e., by computing a long XMAC-I and comparing to the received long MAC-I). In some embodiments and/or scenarios, the UE 102 and base station 104-1 may instead generate SDAP PDUs for the DRB (e.g., as discussed above in connection with FIGS. 3A and 3B).

After the UE 102 verifies 942 the long MAC-I, the UE 102 enables integrity protection for the DRB or PDU session. The PDCP controller 122 of UE 102 may then generate a PDCP PDU containing a data packet and a long MAC-I. The UE 102 transmits 944 the PDCP PDU to the base station 104-1 over the DRB (i.e., the specific DRB for which the UE 102 was configured, or a DRB associated with the PDU session for which the UE 102 was configured), and the base station 104-1 verifies 946 the long MAC-I for the data packet. The base station 104-1 may then transmit 948 the data packet to the 5GC 110.

For one or more of the implementations and/or scenarios discussed above in connection with FIGS. 2A-9B, if the base station 104-1 configures the UE 102 to use the long MAC-I format in a Security Mode Command message or an RRC Reconfiguration message, the base station 104-1 may configure the UE 102 to reestablish PDCP for an SRB or a DRB in a Security Mode Command message or an RRC Reconfiguration message. After the base station 104-1 transmits the Security Mode Command message or RRC Reconfiguration message to the UE 102, the UE 102 may respond by reestablishing a PDCP entity of the SRB or the DRB, for example. As used in this disclosure, "PDCP entity" refers to a task, a thread, or an application responsible for PDCP communications for a certain context. The base station 104-1 may reestablish a PDCP entity of the SRB or the DRB in response to configuring the UE 102 to reestablish the PDCP entity of the SRB. After reestablishing the PDCP entity, the UE 102 and the base station 104-1 may start using the long MAC-I format. In some implementations, the UE 102 and the base station 104-1 reset PDCP state variables of the PDCP entity to initial values in response to reestablishing the PDCP entity.

In other implementations and/or scenarios, in the same Security Mode Command message or RRC Reconfiguration message that configures the UE 102 to use the long MAC-I format, the base station 104-1 may configure the UE 102 to not reestablish the PDCP for an SRB or a DRB. In this case, the UE 102 does not reestablish a PDCP entity of the SRB or the DRB in response to the Security Mode Command message or RRC Reconfiguration message, and the base station 104-1 does not reestablish a PDCP entity of the SRB or the DRB. The UE 102 may start using the long MAC-I format when transmitting a Security Mode Complete message or RRC Reconfiguration Complete message to the base station 104-1. The base station 104-1 may start using the long MAC-I format when receiving the Security Mode Complete message or the RRC Reconfiguration Complete message from the UE 102. In some implementations, the UE 102 and the base station 104-1 do not reset PDCP state variables of the PDCP entity to initial values if not reestablishing the PDCP entity.

In some implementations and/or scenarios, after the base station 104-1 configures the UE 102 to use the long MAC-I format (e.g., as described above) for a session, the base station 104-1 is not permitted to reconfigure the UE 102 to use the short MAC-I format during that session.

Figure 10:
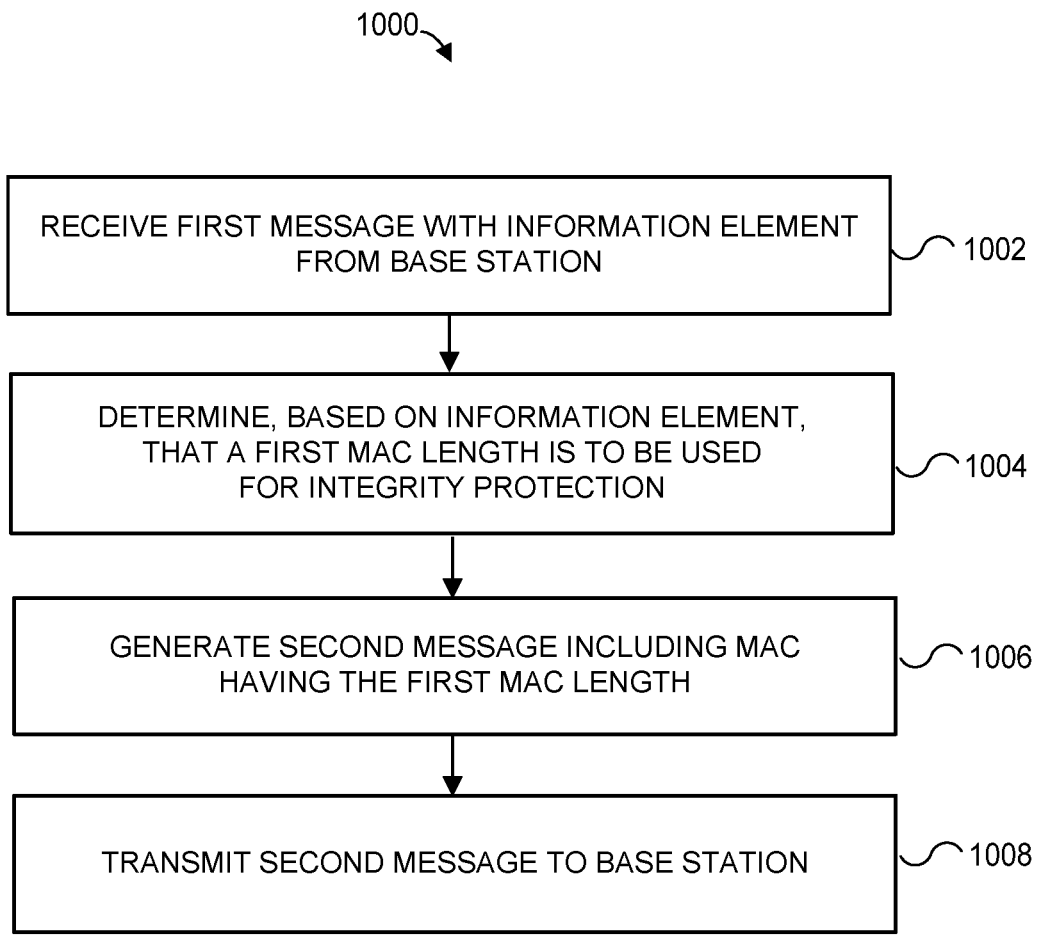
FIG. 10 is a flow diagram of an example method for applying the appropriate MAC length for integrity protection, from a user device perspective.

Referring now to FIG. 10, an example method 1000 for enhancing integrity protection can be implemented in a user device that supports a plurality of MAC lengths, such as the UE 102 of FIG. 1, for example.

At block 1002 of the method 1000, the user device receives a first message, including an information element, from a base station (e.g., base station 104-1 of FIG. 1). The first message may include an RRC message (e.g., an RRC Reconfiguration message), or a security Mode Command message, in which the information element is contained, for example. As a more specific example, the first message can be associated with the transmission 226 of FIG. 2A, transmission 326 of FIG. 3A, transmission 426 of FIG. 4A, transmission 722 of FIG. 7A, transmission 822 of FIG. 8A, or transmission 922 of FIG. 9A.

At block 1004, the user device determines, based on the information element, that a first MAC length (e.g., 64-bit, 128-bit, 256-bit, or another suitable length), of a plurality of MAC lengths (e.g., two MAC lengths, or three MAC lengths, etc.), is to be used for integrity protection. The user device may make the determination at block 1004 solely for user plane messages, solely for control plane messages, or for both user plane and control plane messages. In the examples above, the user device makes this determination at block 230 (FIG. 2A), block 330 (FIG. 3B), block 430 (FIG. 4B), block 724 (FIG. 7A), block 824 (FIG. 8A), or block 924 (FIG. 9A).

At block 1006, after making the determination at block 1004, the user device generates a second message including a MAC having the first MAC length. The MAC may be a MAC-I (i.e., an access stratum MAC), for example. Block 1006 may include computing the MAC (e.g., using any of the types of integrity protection algorithms discussed above) and appending the MAC to payload in the second message, for example. In addition to the MAC, the second message may include an RRC message (e.g., an RRC Reconfiguration Complete message), for example.

At block 1008, the user device transmits the second message to the base station, e.g., transmission 232 of FIG. 2B, transmission 332 of FIG. 3B, transmission 432 of FIG. 4B, transmission 726 of FIG. 7A, transmission 826 of FIG. 8A, or transmission 926 of FIG. 9A. If the determination at block 1004 was for (at least) user plane messages, then block 1004 may include generating a data packet, and block 1006 may include transmitting the second message (with data packet and MAC) over a DRB.

In some implementations and/or scenarios, the method 1000 includes one or more additional blocks not shown in FIG. 10. For example, the method 1000 may include additional blocks, occurring after block 1002, in which the user device computes an expected MAC having a second MAC length (e.g., 32 bits, or another suitable length) of the plurality of MAC lengths, and compares the expected MAC to a MAC in the first message to verify that the MAC in the first message is a valid MAC. The user device may compute the expected MAC using any of the types of integrity protection algorithms discussed above, for example. The second MAC length may be shorter than the first MAC length, for example.

As another example, in an implementation and/or scenario where the determination at block 1004 was for user plane messages, the method 1000 may include additional blocks in which the user device generates a third message that includes an RRC message (e.g., an RRC Reconfiguration Complete message) and a MAC having the second MAC length, and in which the user device transmits the third message to the base station, e.g., transmission 332 of FIG. 3B.

As another example, in an implementation and/or scenario where the determination at block 1004 was for both user plane and control plane messages, the method 1000 may include additional blocks in which the user device generates a third message that includes an RRC message (e.g., an RRC Reconfiguration Complete message) and a MAC having the first MAC length, and in which the user device transmits the third message to the base station, e.g., transmission 232 of FIG. 2B, transmission 432 of FIG. 4B, or transmission 736 of FIG. 7B.

As another example, in an implementation and/or scenario where the determination at block 1004 was for control plane messages, the method 1000 may include additional blocks in which (1) the user device receives a third message including both a second RRC message (e.g., an RRC Reconfiguration message) containing another information element, and a MAC having the first MAC length; (2) the user device computes an expected MAC having the first MAC length (e.g., using any of the types of integrity protection algorithms discussed above); (3) compares the expected MAC to the received MAC to verify that the received MAC is valid; (4) determines, based on the information element in the second RRC message, that integrity protection is to be enabled for user plane messages; and (5) transmits the additional message to the base station. For example, the user device can generate transmission 832 of FIG. 8B.

In some implementations and/or scenarios, the user device, prior to receiving the first message at block 1002, receives a message requesting capabilities of the user device (e.g., an RRC UE Capability Enquiry message) from the base station (e.g., transmission 504 of FIG. 5), and in response transmits to the base station a message including an information element indicating that the user device supports the first MAC length (e.g., an RRC UE Capability Information message), e.g., transmission 506 of FIG. 5.

Figure 11:
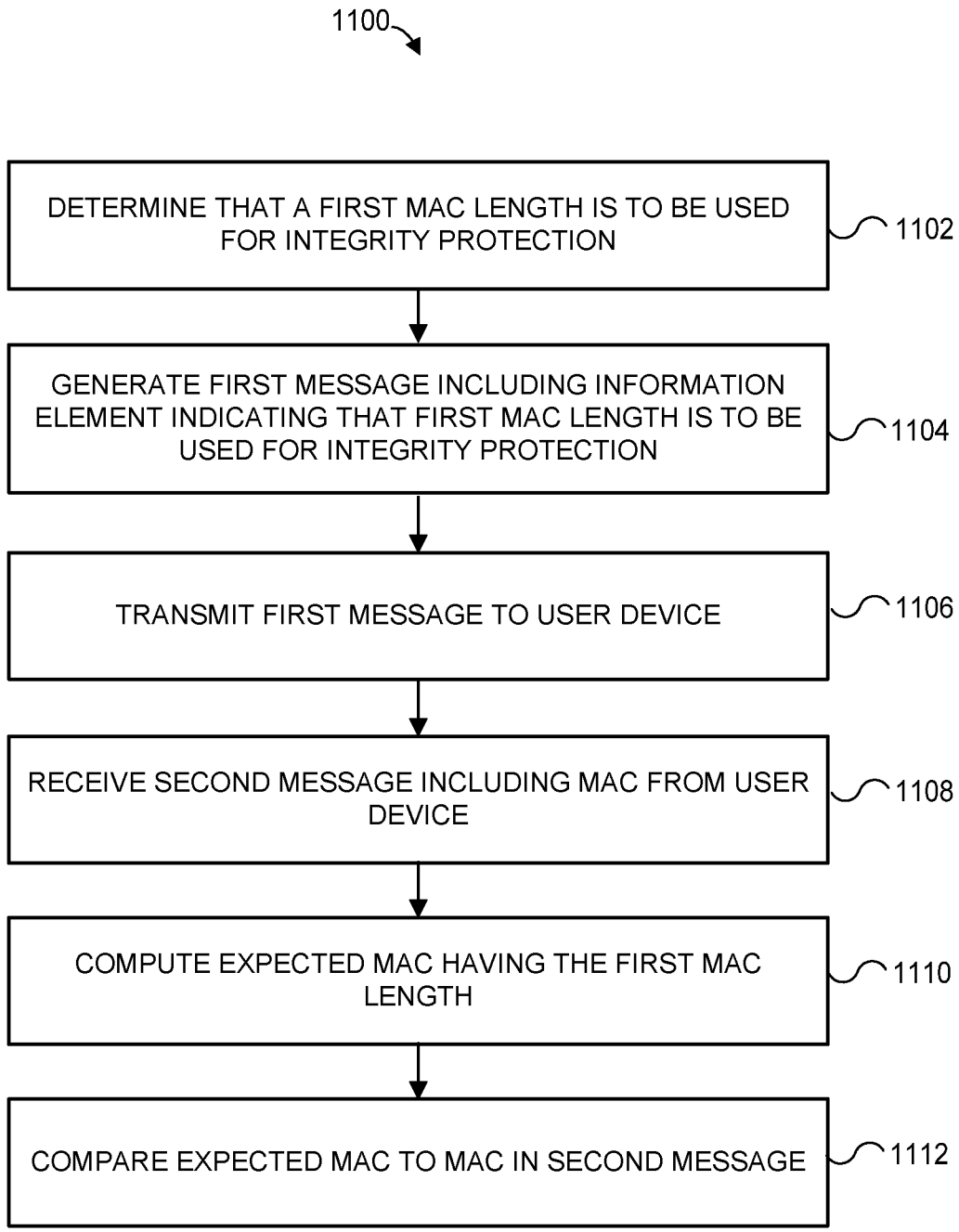
FIG. 11 is a flow diagram of an example method for applying the appropriate MAC length for integrity protection, from a base station perspective.

FIG. 11 depicts an example method 1100 for enhancing integrity protection that can be implemented in a base station that supports a plurality of MAC lengths, such as the base station 104-1 of FIG. 1, for example. The base station may implement the method 1100 while a user device (e.g., the UE 102 of FIG. 1) implements the method 1000, for example.

At block 1102 of the method 1100, the base station determines that a first MAC length (e.g., 64-bit, 128-bit, 256-bit, or another suitable length), of a plurality of MAC lengths (e.g., two MAC lengths, or three MAC lengths, etc.), is to be used for integrity protection. Examples of this determination includes block 224 of FIG. 2A, block 324 of FIG. 3A, block 424 of FIG. 4A, block 620 of FIG. 6, block 720 of FIG. 7, block 820 of FIG. 8A, and block 920 of FIG. 9A. Block 1102 may include transmitting to the user device a message requesting capabilities of the user device (e.g., an RRC UE Capability Enquiry message), and in response receiving from the user device a message including an information element indicating that the user device supports the first MAC length (e.g., an RRC UE Capability Information message), for example. As a more specific example, this message can be associated with transmission 504 of FIG. 5. Alternatively, block 1102 may include receiving, from a core network (e.g., from the 5GC 110), either an indication that the user device supports the first MAC length, or a command to use (i.e., configure to) the first MAC length (e.g., transmission 616 of FIG. 6, transmission 716 of FIG. 7A, transmission 816 of FIG. 8A, or transmission 916 of FIG. 9A).

At block 1104, the base station generates a first message that includes an information element indicating that the first MAC length is to be used for integrity protection. Block 1104 may include computing a MAC having a second MAC length of the plurality of MAC lengths (e.g., shorter than the first MAC length), and appending that MAC to payload in the first message. The base station may compute the MAC using any of the types of integrity protection algorithms discussed above, for example.

At block 1106, the base station transmits the first message to a user device (e.g., the UE 102). The first message may include an RRC message (e.g., an RRC Reconfiguration message) or a Security Mode Command message, for example, and possibly also a MAC having the second (e.g., shorter) MAC length. For example, this message can be associated with the transmission 226 of FIG. 2A, transmission 326 of FIG. 3A, transmission 426 of FIG. 4A, transmission 722 of FIG. 7A, transmission 822 of FIG. 8A, or transmission 922 of FIG. 9A.

At block 1108, after transmitting the first message at block 1106, the base station receives, from the user device, a second message including a MAC (e.g., reception by the base station of transmission 232 of FIG. 2B, transmission 332 of FIG. 3B, transmission 432 of FIG. 4B, transmission 726 of FIG. 7A, transmission 826 of FIG. 8A, or transmission 926 of FIG. 9A). The MAC may be a MAC-I (i.e., an access stratum MAC), for example. At block 1110, the base station computes an expected MAC having the first MAC length (e.g., using any of the types of integrity protection algorithms discussed above). The expected MAC may be an XMAC-I (i.e., an access stratum XMAC), for example. At block 1112, the base station compares the expected MAC to the MAC in the second message to verify that the MAC in the second message is a valid MAC (e.g., verification 234 of FIG. 2B, verification 334 of FIG. 3B, verification 434 of FIG. 4B, verification 730 of FIG. 7A, verification 830 of FIG. 8A, or verification 930 of FIG. 9A).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain implementations are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate, through the principles disclosed herein, still additional alternative structural and functional designs for providing integrity protection in wireless communication networks that generally support message authentication codes of different lengths. Thus, while particular implementations and applications have been illustrated and described, it is to be understood that the disclosed implementations are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a user device that supports a plurality of message authentication code (MAC) lengths for integrity protection of wireless communications, the method comprising:

receiving, from a base station, a first message including (i) an information element indicating a first MAC length of the plurality of MAC lengths and (ii) a MAC having a second MAC length of the plurality of MAC lengths;

when the information element indicates that the first MAC length is to be used for integrity protection, generating a second message including a MAC having the first MAC length; and transmitting the second message to the base station.

2. The method of claim 1, further comprising, after receiving the first message:

computing an expected MAC having the second MAC length; and comparing the expected MAC to the MAC in the first message to verify that the MAC in the first message is a valid MAC, wherein generating the second message includes
computing the MAC having the first MAC length, and
appending the MAC having the first MAC length to payload in the second message.

3. The method of claim 1, wherein:

receiving the first message includes receiving a first radio resource control (RRC) message;

determining that the first MAC length is to be used for user plane messages;

generating the second message includes generating a data packet;

transmitting the second message to the base station includes transmitting the second message over a data radio bearer (DRB); and the method further comprises
generating a third message including a second RRC message and an additional MAC having the second MAC length or a third MAC length of the plurality of MAC lengths, and
transmitting the third message to the base station.

4. The method of claim 1, wherein:

receiving the first message includes receiving a first radio resource control, RRC, message;

determining that the first MAC length is to be used for both user plane messages and control plane messages;

generating the second message includes generating a data packet;

transmitting the second message to the base station includes transmitting the second message over a data radio bearer (DRB); and the method further comprises
generating a third message including a second RRC message and an additional MAC having the first MAC length, and
transmitting the third message to the base station.

5. The method of claim 1, wherein:

receiving the first message includes receiving a security mode command message;

determining that the first MAC length is to be used for control plane messages;

generating the second message includes generating a first radio resource control (RRC) message; and the method further comprises
receiving a third message including (i) a second RRC message containing another information element and (ii) a first MAC having the first MAC length,
computing an expected MAC having the first MAC length,
comparing the expected MAC to the first MAC to verify that the first MAC is a valid MAC, when the other information element indicates that integrity protection is enabled for user plane messages, generating a fourth message including a data packet and a second MAC having the first MAC length; and transmitting the fourth message to the base station.

6. The method of claim 1, further comprising, prior to receiving the first message:

receiving a message requesting capabilities of the user device from the base station; and transmitting, to the base station and in response to the message requesting capabilities of the user device, a message including an information element indicating that the user device supports the first MAC length.

7. A method in a base station that supports a plurality of message authentication code (MAC) lengths for integrity protection of wireless communications, the method comprising:

generating a first message including (i) an information element indicating that a first MAC length, of the plurality of MAC lengths, is to be used for integrity protection and (ii) a MAC having a second MAC length of the plurality of MAC lengths;

transmitting the first message to a user device;

after transmitting the first message, receiving, from the user device, a second message including a MAC having the first MAC length;

computing an expected MAC having the first MAC length; and comparing the expected MAC to the MAC in the second message to verify that the MAC in the second message is a valid MAC.

8. The method of claim 7, wherein generating the first message includes:

computing an additional MAC having the second MAC length, the second MAC length being less than the first MAC length; and appending the additional MAC to payload in the first message.

9. The method of claim 7, further comprising, before generating the first message:

transmitting to the user device a message requesting capabilities of the user device; and receiving, from the user device and in response to the message requesting capabilities of the user device, a message including an information element indicating that the user device supports the first MAC length.

10. The method of claim 7, further comprising, before generating the first message:

receiving, from a core network, either (i) an indication that the user device supports the first MAC length, or (ii) a command to use the first MAC length.

11. The method of claim 7, wherein:

generating the first message includes generating a first radio resource control (RRC) message;

the method further comprises determining that the first MAC length is to be used for user plane messages;

receiving the second message includes receiving a message including a data packet over a data radio bearer (DRB); and the method further comprises receiving, from the user device, a third message including a second RRC message and an additional MAC having the second MAC length or a third MAC length of the plurality of MAC lengths.

12. The method of claim 7, wherein:

generating the first message includes generating a first radio resource control, RRC, message;

the method further comprises determining that the first MAC length is to be used for both user plane messages and control plane messages;

receiving the second message includes receiving a message including a data packet over a data radio bearer (DRB); and the method further comprises receiving, from the user device, a third message including a second RRC message and an additional MAC having the first MAC length.

13. The method of claim 7, wherein:

generating the first message includes generating a security mode command message;

the method further comprises determining that the first MAC length is to be used for control plane messages;

receiving the second message includes receiving a first radio resource control (RRC) message; and the method further comprises generating a third message including (i) a second RRC message containing another information element and (ii) a first MAC having the first MAC length, transmitting the third message to the user device, and receiving, from the user device, a fourth message including a data packet and a second MAC having the first MAC length.

14. A method in one or more core network elements, the method comprising:

receiving, from either a first base station or a second base station, a first message including a first information element;

when the first information element indicates that a user device supports a first message authentication code (MAC) length, of a plurality of MAC lengths supported by the first base station, for integrity protection, generating a second message including a second information element indicating that the first MAC length is to be used for integrity protection of wireless communications between the first base station and the user device; and transmitting the second message to the first base station to configure the first base station to use the first MAC length for wireless communications with the user device.

15. The method of claim 14, wherein generating the second message includes generating a next generation application protocol (NGAP) message.

16. The method of claim 14, wherein generating the second message includes generating an initial context setup request message.

17. The method of claim 14, wherein:

the second information element indicates that the first MAC length is to be used for integrity protection of wireless communications over a data radio bearer (DRB) or during a protocol data unit (PDU) session; and transmitting the second message to the first base station is to configure the first base station to use the first MAC length for wireless communications with the user device over the DRB or during the PDU session.

18. The method of claim 17, further comprising, prior to generating the second message:

generating a third message including a third information element indicating that the first MAC length is to be used for integrity protection of wireless communications over one or more signal radio bearers (SRBs); and transmitting the third message to the first base station to configure the first base station to use the first MAC length for wireless communications with the user device over the one or more SRBs.

19. A user device comprising hardware and supporting a plurality of message authentication code (MAC) lengths for integrity protection of wireless communications, the user device being configured to:

receive, from a base station, a first message including (i) an information element indicating a first MAC length of the plurality of MAC lengths and (ii) a MAC having a second MAC length of the plurality of MAC lengths;

when the information element indicates that the first MAC length is to be used for integrity protection, generate a second message including a MAC having the first MAC length; and transmit the second message to the base station.

20. A base station comprising hardware and supporting a plurality of message authentication code (MAC) lengths for integrity protection of wireless communications, the base station being configured to:

generate a first message including (i) an information element indicating that a first MAC length of the plurality of MAC lengths is to be used for integrity protection and (ii) a MAC having a second MAC length of the plurality of MAC lengths;

transmit the first message to a user device;

after transmitting the first message, receive from the user device a second message including a MAC having the first MAC length;

compute an expected MAC having the first MAC length; and compare the expected MAC to the MAC in the second message to verify that the MAC in the second message is a valid MAC.

* * * * *

UNITED STATES PATENT AND TRADEMARK OFFICE
CERTIFICATE OF CORRECTION

PATENT NO. : 11,917,410 B2
APPLICATION NO. : 17/419401
DATED : February 27, 2024
INVENTOR(S) : Chih-Hsiang Wu Page 1 of 1

It is certified that error appears in the above-identified patent and that said Letters Patent is hereby corrected as shown below:

In the Claims

At Column 28, Line 25, "determining that the first MAC length is to be used for user plan messages" should be -- the method further comprises determining that the first MAC length is to be used for user plane messages --.

At Column 28, Line 41, "determining that the first MAC length is to be used for both user plane messages and control plane messages" should be -- the method further comprises determining that the first MAC length is to be used for both user plane messages and control plane messages --.

At Column 28, Line 56, "determining that the first MAC length is to be used for control plane messages" should be -- the method further comprises determining that the first MAC length is to be used for control plane messages --.

Signed and Sealed this
Twenty-first Day of January, 2025

Coke Morgan Stewart
*Acting Director of the United States Patent and Trademark Office*